US009094282B2

(12) United States Patent
Richardson et al.

(10) Patent No.: US 9,094,282 B2
(45) Date of Patent: Jul. 28, 2015

(54) SYSTEM AND METHOD FOR RULE-BASED INFORMATION ROUTING AND PARTICIPATION

(71) Applicant: Benbria Corporation, Ottawa (CA)

(72) Inventors: Ronald Richardson, Kanata (CA); Ying Du, Ottawa (CA)

(73) Assignee: Benbria Corporation, Ottawa (CA)

( * ) Notice: Subject to any disclaimer, the term of this patent is extended or adjusted under 35 U.S.C. 154(b) by 0 days.

(21) Appl. No.: 13/791,482

(22) Filed: Mar. 8, 2013

(65) Prior Publication Data
US 2013/0290532 A1    Oct. 31, 2013

Related U.S. Application Data

(63) Continuation-in-part of application No. 13/728,240, filed on Dec. 27, 2012, and a continuation-in-part of application No. 13/458,527, filed on Apr. 27, 2012, now Pat. No. 8,943,061.

(51) Int. Cl.
*G06F 17/30* (2006.01)
*H04L 12/24* (2006.01)
*G06Q 10/10* (2012.01)

(52) U.S. Cl.
CPC ............... *H04L 41/00* (2013.01); *G06Q 10/10* (2013.01)

(58) Field of Classification Search
CPC . G06Q 50/01; G06Q 10/06; G06Q 10/06311; G06F 17/30867; G06F 17/3053; G06F 17/30598; G06F 21/552; G06F 9/542; H04L 45/308; H04L 63/0227; Y10S 707/99932
USPC .......... 707/610, 732, 706, 723, 736; 709/206, 709/238, 240; 715/752; 705/26, 301, 304; 379/265.11, 88.22
See application file for complete search history.

(56) References Cited

U.S. PATENT DOCUMENTS

| 6,545,589 | B1 * | 4/2003 | Fuller et al. ................... 340/7.22 |
|---|---|---|---|
| 7,023,979 | B1 * | 4/2006 | Wu et al. ................... 379/265.11 |
| 7,034,691 | B1 | 4/2006 | Rapaport et al. |
| 7,092,914 | B1 * | 8/2006 | Shear et al. ..................... 705/67 |
| 7,318,043 | B1 * | 1/2008 | Silver et al. ................ 705/26.81 |
| 7,519,562 | B1 * | 4/2009 | Vander Mey et al. .......... 705/500 |
| 8,364,840 | B2 * | 1/2013 | Barros .......................... 709/238 |
| 8,595,302 | B2 * | 11/2013 | Krishnamurthi et al. ..... 709/206 |
| 2003/0217109 | A1 * | 11/2003 | Ordille et al. ................. 709/206 |
| 2004/0114735 | A1 * | 6/2004 | Arning et al. ............... 379/93.24 |
| 2004/0193617 | A1 | 9/2004 | Adler |
| 2005/0204002 | A1 * | 9/2005 | Friend ........................... 709/206 |
| 2006/0109113 | A1 | 5/2006 | Reyes et al. |
| 2006/0234672 | A1 | 10/2006 | Adler |
| 2006/0271675 | A1 | 11/2006 | Wakazono et al. |

(Continued)

FOREIGN PATENT DOCUMENTS

WO    2009/070882    6/2009

*Primary Examiner* — Dennis Truong
(74) *Attorney, Agent, or Firm* — Nixon Peabody LLP

(57) ABSTRACT

What is disclosed is a system for communicating information between one or more participants of a loop, the one or more participants being associated with an organization, the system comprising one or more processors configured to initiate a loop in response to receiving an input from a first participant of the loop, the loop being associated with one or more attributes; determine, based on one or more first routing rules, a second participant of the loop; and in response to the determination, provide access to a first portion of information associated with the loop to the second participant.

20 Claims, 20 Drawing Sheets

(56) References Cited

U.S. PATENT DOCUMENTS

| | | |
|---|---|---|
| 2006/0273893 A1 | 12/2006 | Warner |
| 2006/0294085 A1* | 12/2006 | Rose et al. .................. 707/3 |
| 2007/0019616 A1* | 1/2007 | Rantapuska et al. .......... 370/352 |
| 2007/0107059 A1* | 5/2007 | Chasin et al. .................. 726/23 |
| 2007/0130363 A1* | 6/2007 | Barros .......................... 709/238 |
| 2008/0285560 A1* | 11/2008 | Curtis et al. .................. 370/392 |
| 2009/0034696 A1* | 2/2009 | Ramanathan ............... 379/88.17 |
| 2009/0055220 A1 | 2/2009 | Rappoport et al. |
| 2009/0210244 A1* | 8/2009 | Koister et al. ...................... 705/1 |
| 2009/0258678 A1* | 10/2009 | Chava et al. .................. 455/557 |
| 2009/0276712 A1 | 11/2009 | Gregory et al. |
| 2009/0300690 A1 | 12/2009 | Xu et al. |
| 2009/0325538 A1 | 12/2009 | Senett et al. |
| 2010/0100412 A1* | 4/2010 | Cases et al. ........................ 705/9 |
| 2010/0146057 A1 | 6/2010 | Abu-Hakima et al. |
| 2010/0153354 A1* | 6/2010 | Buccella et al. ............... 707/706 |
| 2010/0199188 A1 | 8/2010 | Abu-Hakima et al. |
| 2010/0306061 A1 | 12/2010 | Wagner |
| 2011/0029615 A1* | 2/2011 | Shaffer et al. ................. 709/206 |
| 2011/0093544 A1* | 4/2011 | Yasrebi et al. ................. 709/206 |
| 2011/0167071 A1* | 7/2011 | Yang ............................. 707/741 |
| 2011/0276513 A1 | 11/2011 | Erhart et al. |
| 2011/0302653 A1* | 12/2011 | Frantz et al. ..................... 726/22 |
| 2012/0072844 A1 | 3/2012 | des Courtis et al. |
| 2012/0089692 A1* | 4/2012 | Stoddard et al. .............. 709/206 |
| 2012/0166244 A1* | 6/2012 | Raj et al. ...................... 705/7.13 |
| 2013/0066864 A1* | 3/2013 | Rose et al. ..................... 707/732 |
| 2013/0317941 A1* | 11/2013 | Stoll et al. .................. 705/26.35 |
| 2014/0019443 A1* | 1/2014 | Golshan ........................ 707/723 |

* cited by examiner

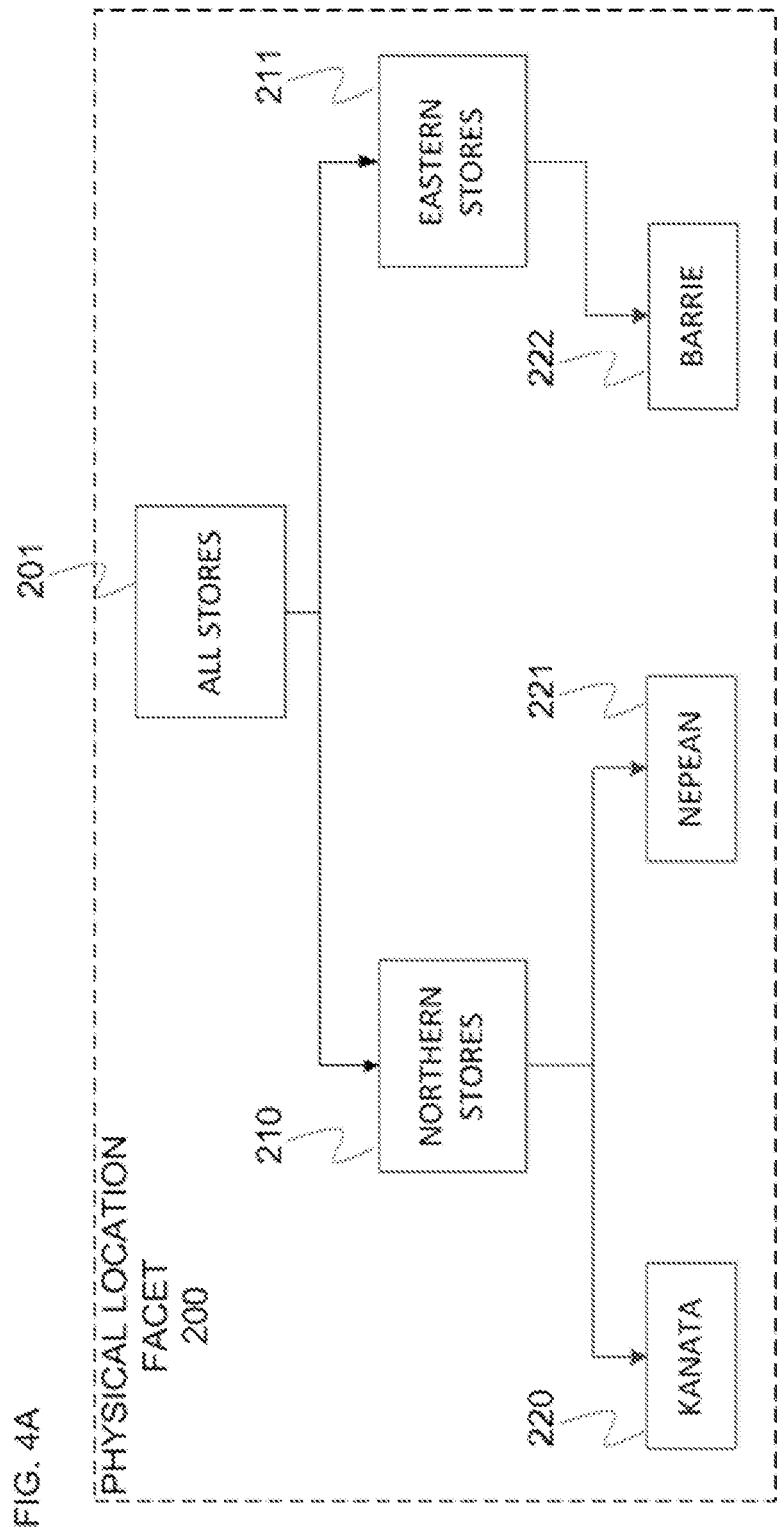

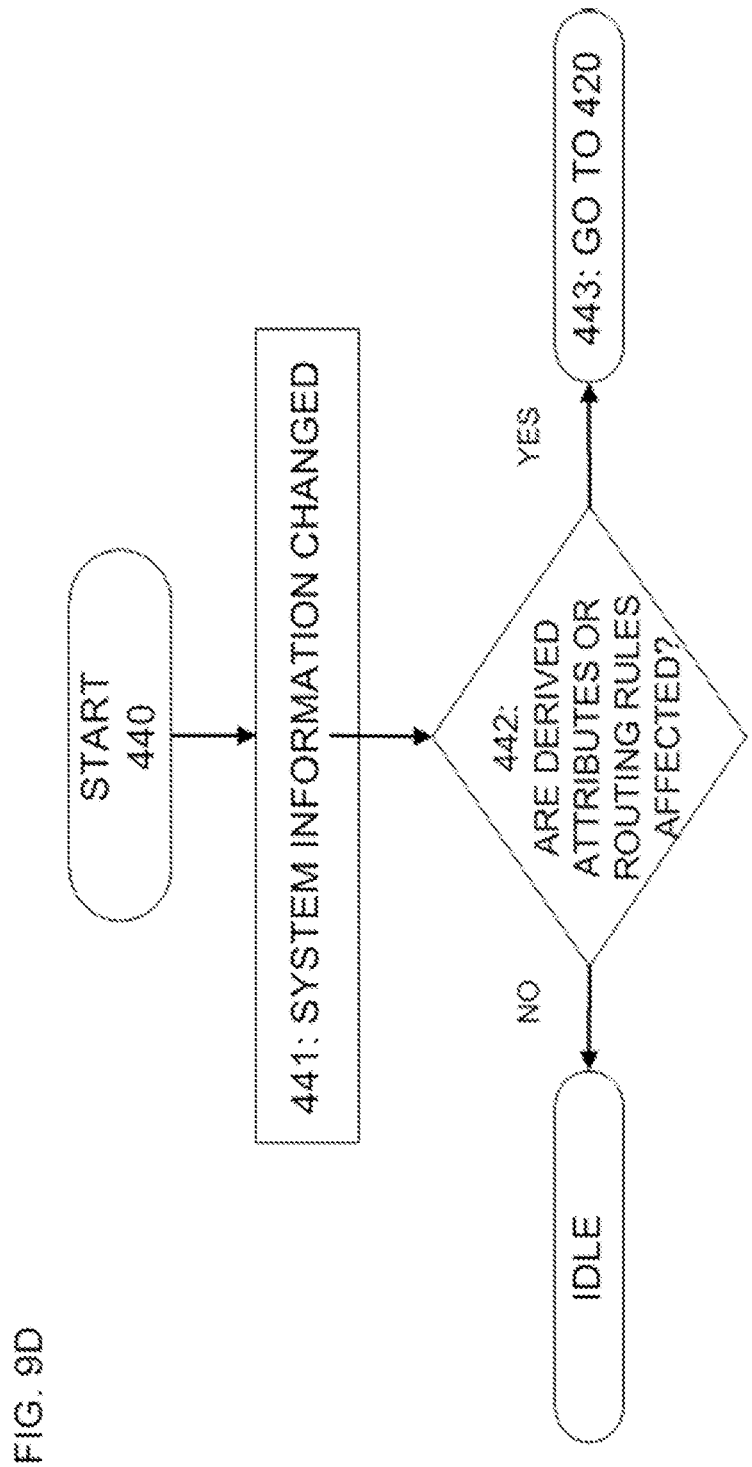

FIG. 9E

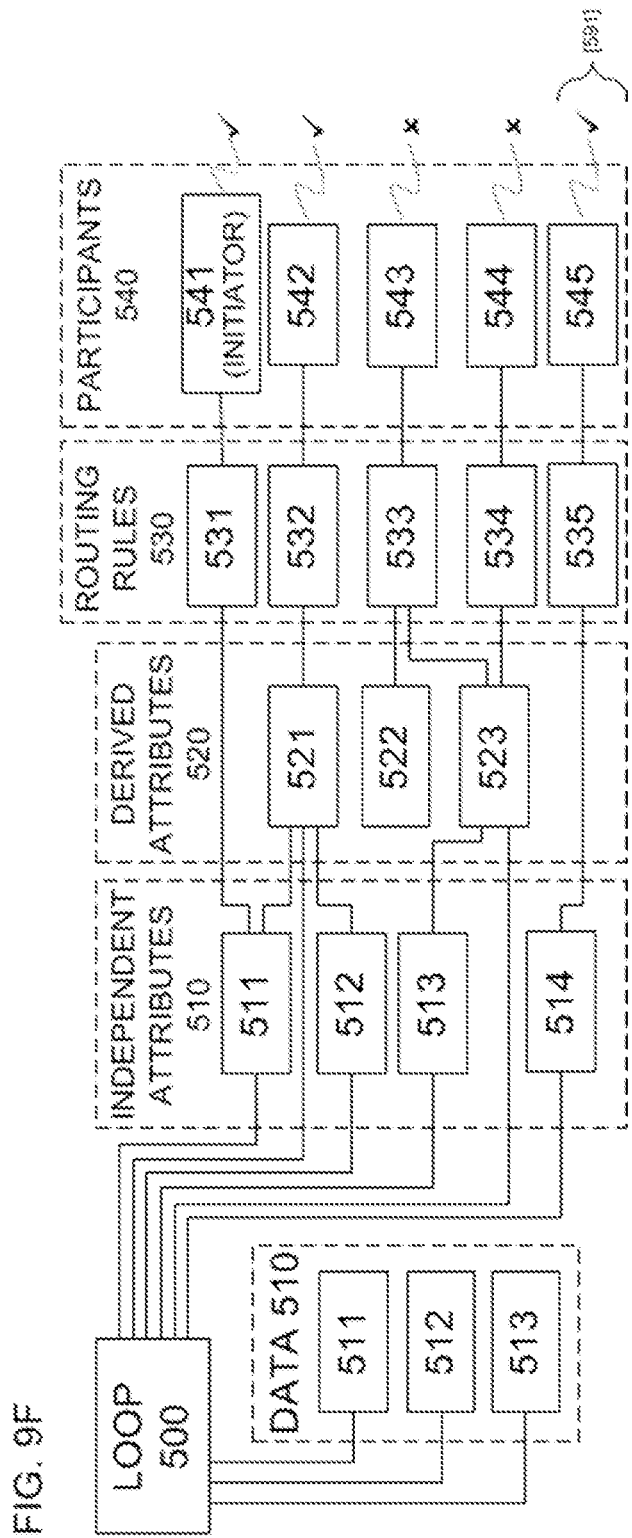

US 9,094,282 B2

SYSTEM AND METHOD FOR RULE-BASED INFORMATION ROUTING AND PARTICIPATION

CROSS REFERENCE TO RELATED APPLICATIONS

This application is a continuation-in-part of prior U.S. application Ser. No. 13/728,240, filed Dec. 27, 2012; this application is a continuation-in-part of prior U.S. application Ser. No. 13/458,527, filed Apr. 27, 2012; each of the foregoing patent applications is hereby incorporated by reference herein in its entirety.

FIELD OF THE INVENTION

This invention is directed generally to information routing systems, and more particularly, to systems and methods for rule-based information routing and participation.

BACKGROUND OF THE INVENTION

Every day, the people of modern organizations are made aware of, discuss, and resolve issues—a process that inevitably requires communication between specific and contextually appropriate members of that organization. These issues may originate from customers of an organization (external party) and/or employees of an organization (internal party), may include positive or negative feedback, may involve any number of people within the organization or outside of the organization, and may require extensive collaboration to address and/or solve. In all cases of an issue, however, focused communication between identified individuals within the organization can benefit and expedite a resolution of the issue.

For an example of an issue raised by an internal party, an employee could raise a policy issue requiring the participation of other employees and managers regarding a business's operational unit. For an example of an issue raised by an external party, a customer of the organization could raise a customer service issue that requires the attention and participation of employees at a specific location of the organization in addition to management at one or more remote locations (e.g., individuals dispersed geographically).

Modern organizations, such as a modern multi-national corporation or distributed chain, are complex, multi-faceted, and involve stakeholders and/or employees at many levels, with many skillsets, and in many locations. Thus, a need exists for systems that enable rapid resolution of issues in an effective manner by ensuring that relevant participants are involved as needed and are provided with information necessary to facilitate the resolution.

SUMMARY OF THE INVENTION

A system for communicating information between one or more participants of a loop, the one or more participants being associated with an organization, the system comprising one or more processors configured to initiate a loop in response to receiving an input from a first participant of the loop, the loop being associated with one or more attributes; determine, based on one or more first routing rules, a second participant of the loop; and in response to the determination, provide access to a first portion of information associated with the loop to the second participant.

A method for communicating information between one or more participants of a loop, wherein said participants are associated with an organization, the method comprising, using one or more processors, initiating, by a first participant, a loop associated with one or more attributes; determining, based on one or more first routing rules, a second participant of the loop; and in response to the determining, providing the second participant of the loop with access to a first portion of information associated with the loop.

BRIEF DESCRIPTION OF THE DRAWINGS

The present disclosure may best be understood by reference to the following description taken in conjunction with the accompanying drawings.

FIG. 4A shows relationships within the Physical Location facet of Table 1;

FIG. 9D is a flowchart illustrating behavior of a system in response to information available to the system being changed according to some implementations of the present concepts;

FIG. 9E shows a system interface for use in configuring escalation rules based on information available to a system according to some implementations of the present concepts;

FIG. 9F is a detailed view of some of the elements of the diagram of FIG. 1 following the addition of a new independent attribute according to some implementations of the present concepts;

DETAILED DESCRIPTION OF ILLUSTRATED EMBODIMENTS

Although the present disclosure is described in connection with certain preferred embodiments and/or implementations, it will be understood that the present disclosure is not limited to those particular embodiments and/or implementations. On the contrary, the present disclosure is intended to cover all alternatives, modifications, and equivalent arrangements as may be included within the spirit and scope of the present disclosure as defined by the appended claims.

The Loop

The present disclosure describes a system and method for routing information among participants of an issue resolution process. The issue resolution process includes (i) initiating a loop, (ii) associating attributes and data to the loop, (iii) identifying participants of the loop using routing rules and associated attributes, (iv) routing information between participants of the issue resolution process, and (v) modifying the routing based on permissions of each participate.

Figure 1:
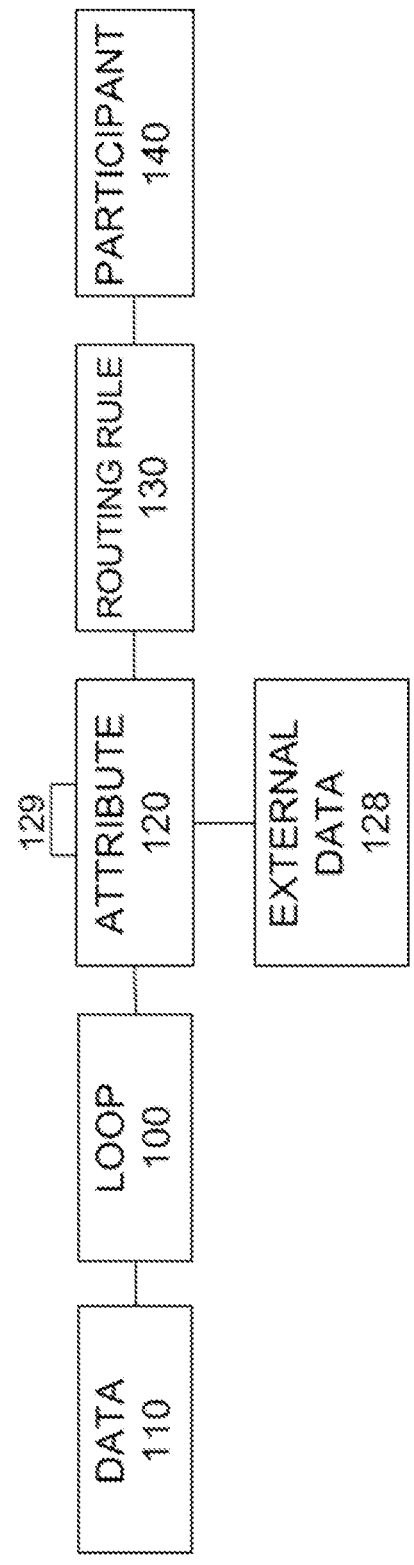
FIG. 1 is a diagram illustrating logical relationships between primary system elements connecting data and participants of a rule-based information routing system according to some implementations of the present concepts.

FIG. 1 shows loop 100. The loop 100 is a collection of links (e.g., pointers, references, etc.) to data and/or information (e.g., attributes) stored in one or more memories associated with an issue to be resolved by one or more participates of an issue resolution process. Put another way, the loop 100 is a unification of a plurality of items, such as, for example, attributes and data associated with the loop 100. Additional examples of such items include, but are not limited to:

data 110 which typically includes message(s) surrounding a topic of discussion (e.g., an issue) created by an initiator (e.g., a customer of an organization or an employee of an organization). These messages can include, for example, written or typed text, pictures, video, voice, sound clips, microblog updates, links, or other digital media, similar media, or a combination thereof.

conversation strings between participants including responses to the initiator, internal notes, which might not be visible to the initiator, actions taken by one or more of the participants, assignments of action(s) or responsibility from one participant to another, comments from the initiator, changes to metadata, responses to specific questions, ratings or star ratings submitted by the initiator or other participant, and similar activity concerning the loop becomes additional data 110 associated to the loop 100.

logging information, tracking of activity, and data surrounding these items that becomes additional data 110 associated with the loop 100.

Metadata referred to herein as attributes 120 is associated with the loop 100. The information (e.g., the customer response 'Yes' to a question 'Was your food hot?') stored by any attribute 120 may be treated by the system as data 110. Similarly, any data 110 may be treated by the system as an attribute 120. Generally, attributes are pieces of information distinguished based on their use in system behaviour. The loop 100 can also be referred to as a nexus of relationships between data 110, attributes 120, and participants 140. The nature of the relationships is determined by routing rules 130, which connect participants 140 to attributes 120, which are in turn associated with loop 100. Additionally, permissions, which will be explained later, determine the visibility of associated data 110 to participants 140, as shown in FIG. 1. Attributes 120 that are associated with the loop 100 may reference other attributes (e.g., line 129 in FIG. 1) that are also associated with the loop 100 or that are not otherwise associated with the loop 100. In either case, however, attributes 120 that reference other attributes are referred to as derived attributes.

As will be further described below, if a routing rule associated with a participant is satisfied by one or more of the attributes associated with a loop (thus, making those attributes routing attributes), then the loop is visible to the participant. That is, the loop is made available to the participant. The information and/or data associated with the loop will be visible to the participant if allowed by the permissions associated with the data and/or the permissions associated with the participant.

As will also be explained further below, loops are created or initiated by an initiator (e.g., a customer of an organization or an employee of an organization). The initiator may be any individual or third party system wanting to raise a particular issue, such as, for example, asking a question to the organization, making a request of the organization, providing information or feedback to the organization, etc. The issue can be raised and the loop initiated for feedback purposes (e.g., a customer of the organization wants to let the organization they had a wonderful stay in the organization's hotel but the bed was too small); for discussion; to prompt action (e.g., an employee of an organization wants a supervisor to schedule a review to discuss a potential raise for the employee); to initiate a collaborative effort; to request (e.g., a hotel meeting planner customer requests additional food and beverage, and expects confirmation and expedited delivery), and/or to drive staff action or awareness (e.g., data collected from a customer is displayed live on staff mobile phones and a digital scoreboard on-premise). Examples of initiators can be customers, employees, stakeholders, and/or other systems. A loop can also be initiated through various means which will be discussed further below.

Once initiated, a loop is considered open or live, and stays open/live until it is implicitly or explicitly closed, at which point it is said to be closed.

The Implementation System

Figure 2:
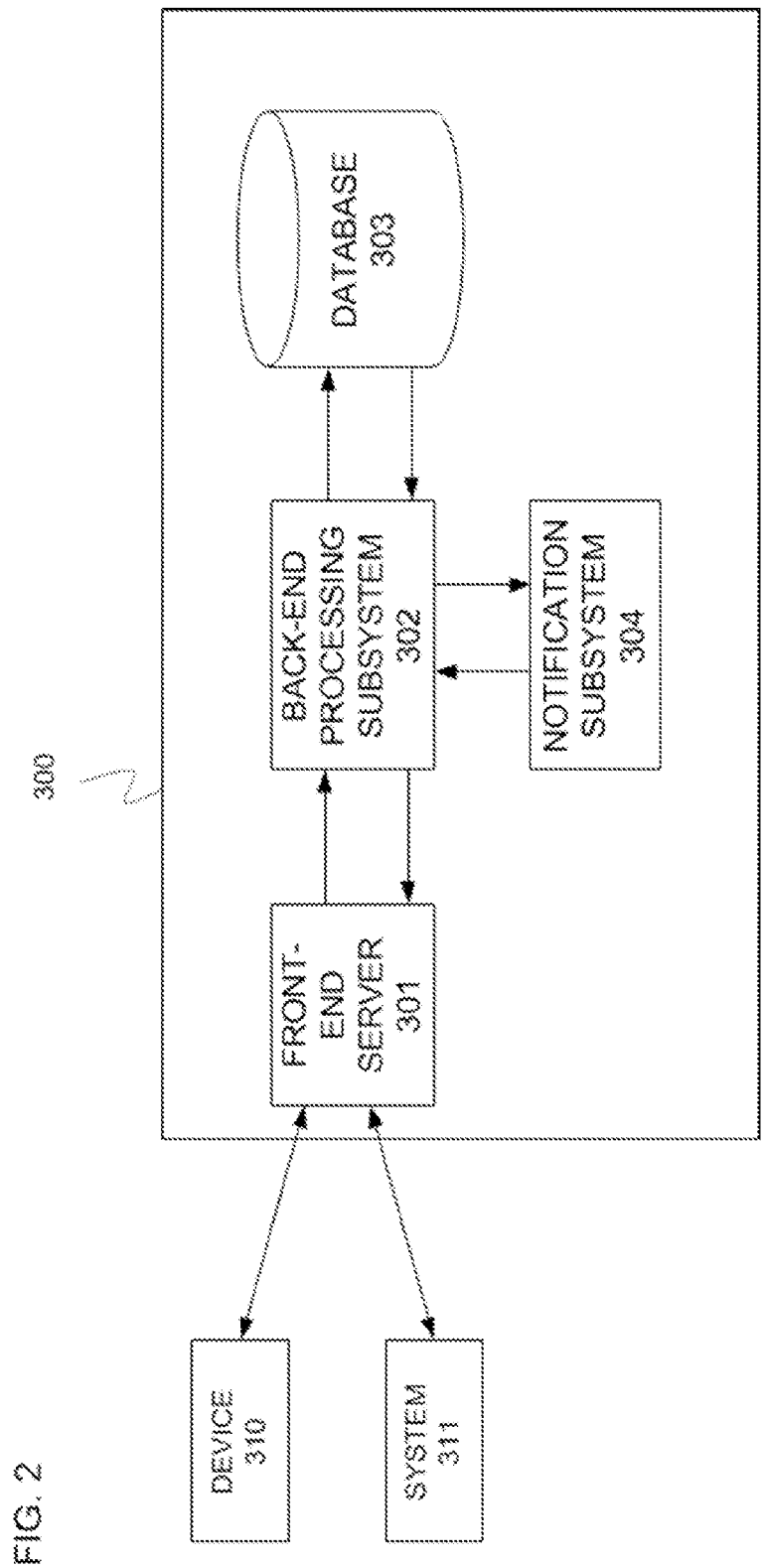
FIG. 2 is a system diagram of a customer engagement system using a rule-based information routing and a participation enterprise system and devices according to some implementations of the present concepts.

A system such as, for example, an enterprise system is used to implement one or more loops. FIG. 2 shows an example of an enterprise system 300 to implement one or more loops. Device 310 is for example, a laptop, smartphone, personal computer, tablet, kiosk, in-store display for staff, server or computing device operated by a participant such as a customer, employee or machine. System 311 is, for example, a 3rd party system or an in-house system such as the system of U.S. patent application entitled "System for Extracting Customer Feedback from a Microblog Site," assigned Ser. No. 13/458,527, filed Apr. 27, 2012, which is commonly owned by the assignee of this application, and which is hereby incorporated by reference herein as if reproduced in its entirety.

Front-end server 301 communicates with devices external to system 300, such as device 310 and system 311. Device 310 and system 311 connect to front-end server 301 over an internal network or an external network, telephone network, local area network, wide area network, personal area network, mesh network, the Internet, or wireless network. For example, a participant using device 310 or system 311 either triggers a loop, or sends messages to other participants by sending information to front-end server 301. Front end server 301 passes information to, and receives information from back-end processing subsystem 302. Back-end processing subsystem 302 performs processing operations related to the loops. Back-end processing subsystem 302 communicates with database 303, where information relevant to the one or more loops implemented by enterprise system 300 is stored. Additionally, when a loop is closed by a participant, back-end processing subsystem 302 indicates to database 303 that the loop is closed. Database 303 stores all information related to the loop, such as, for example, duration of time that the loop was alive, number of participants and who the initiator was. In a further embodiment, one or more ratings can be assigned to the loop via various media.

Back-end processing subsystem 302 connects to notification subsystem 304 to send notifications to participants, or supervisors of participants, as necessary. Various implementations of enterprise system 300 are possible. For example, in one implementation, enterprise system 300 is implemented using a server or servers. In another implementation, it is implemented as a cloud-based implementation. In other implementations, it is implemented in software, hardware or a combination of software and hardware.

Similarly, various implementations of the components of enterprise system 300, that is, the front-end server 301, back-end processing subsystem 302, notification subsystem 304 and database 303 are possible. In one implementation, these components are implemented using a server or servers. In another implementation, these components are implemented using a cloud-based implementation. In other implementations, these components are implemented in software, hardware or a combination of software and hardware.

Figure 3:
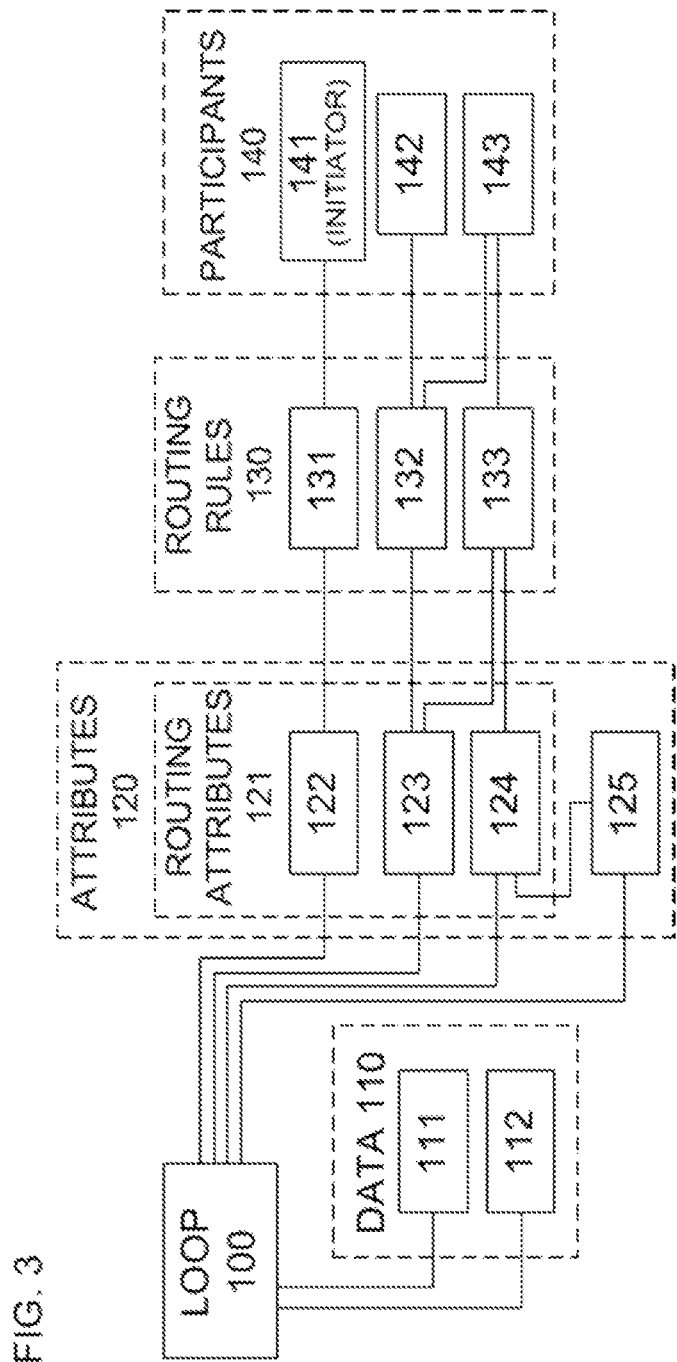
FIG. 3 is a detailed view of some of the elements of the diagram of FIG. 1.

The back-end processing subsystem 302, as previously explained, also stores all relevant information related to the loop in the database 303 of enterprise system 300 of FIG. 3. This information includes but is not limited to one or more of the following: participants, participant profiles, attributes, routing attributes, routing rules used, routing tables, reverse lookup tables and visibility information.

In a further implementation, a subsystem within a system used to implement the loop, such as back-end processing subsystem 302 of enterprise system 300 of FIG. 3, monitors statistics related to the loop, including, but not limited to:
    Time that the loop has been live
    Attributes and any information related to attributes
    Routing notes and any information related to routing attributes
    Number of participants
    Number of messages within the loop Then upon closure of the loop, summary statistics are generated by a subsystem within the system used to implement the loop, such as back-end processing subsystem 302 of enterprise system 300 of FIG. 2. These summary statistics include but are not limited to:
    Time taken for loop to be resolved,
    Average response time for a loop to be responded to,
    Number of loops resolved so far by the participant,
    Outstanding loops for the participant
    Percentage of total loops involving the participant which have been resolved These summary statistics are then stored in a database, such as database 303 of enterprise system 300 of FIG. 2. This enables a person such as a supervisor of a participant to retrieve historical loop information as necessary to monitor the performance of a participant. For example, the supervisor can create reports or monitor statistics related to a particular participant over a selected period of time, to track the performance of a given participant.

In another implementation, for a given loop, once the participants have been identified, the participants are overlaid on an organizational chart, by a subsystem within the system used to implement the loop, such as back-end processing subsystem 302 of enterprise system 300 of FIG. 2, to determine who their supervisors are. Then the supervisors are notified of the initiation of the loop by, for example, notification subsystem 304 of enterprise system 300 of FIG. 3. At closure of the loop, the supervisors are able to download information relating to the loop which has been stored by database 303 of enterprise system 300 of FIG. 2. The supervisor is able to, for example, create reports or generate statistics related to a particular participant, or an attribute. This enables the supervisor to monitor the performance of a participant.

In another implementation, the generated statistics can be overlaid with other performance data so as to study operational trends within a particular company. These can then be used by, for example, supervisors to generate performance reviews and monitor the performance of participants.

In yet another embodiment, information surrounding loops can be forwarded to, for example, customer relationship management (CRM) programs such as Salesforce®. Then, for example, data such as loop ratings can be viewed on a per-customer basis and used to monitor performance of, for example, an account manager responsible for a particular customer.

Attributes and Facets

As mentioned above, an attribute can include a piece of loop metadata. Attributes are associated to the routing rules of a participant to drive loop visibility. An attribute may exist as an independent piece of metadata or derive its value from other information available to the system. Other system mechanisms use attributes to provide functions such as reporting, escalation, or hooks for third party systems. A single attribute managed by the system may have zero to many associations at any given time. An attribute may be created, associated, disassociated or destroyed by the system at any time or at any point during the lifecycle of a loop. Examples of the attributes and data associated with a loop include: an initial message (e.g., text message, e-mail, Short Message Service (SMS), web-based message, application based messages, kiosk input, responses to open or closed-form questions, a message sent via API from an external system, etc.) from a customer of an organization or from an employee of an organization, subsequent related messages, metadata associated with the messages (e.g., timestamps, geo-location tags, user-selected tags, user-selected categorization, and others as enumerated below), peripheral data (e.g., third party information concerning the sales performance of that location, historical performance in cleanliness, etc.), and related contextual information (e.g., time zone of the location, history of loops at the location in question, etc.). Supervisors of the participants are able to monitor the performance of participants in resolving the issue. The supervisors are also able to measure performance of participants across multiple loops over a period of time. Finally, a participant of a loop may be a third party device or system interface.

FIG. 3 shows a more detailed view of loop 100. In FIG. 3, attributes 122, 123, 124 and 125 are associated with loop 100.

Attributes can include, but are not limited to, for example:
    analysis of information including sentiment, keywords, or classification(s) using known analytic methods,
    physical location(s),
    location within a building,
    geo-location information,
    timestamp(s) of creation, modification, or similar events,
    department(s),
    topic category(ies),
    urgency(ies),
    state(s) of resolution,
    event(s) within the system,
    customer(s),
    group(s), role(s) or responsibility(ies),
    participant(s),
    tags or labels,
    customer demographic, loyalty, contact, or other information, and
    inferences drawn about the current state of the system, inferences drawn from other attributes,
the existence of specific associations,
system information,
third party information.

Attributes can be, for example:

Independent: An independent attribute is an attribute which is unrelated to other attributes or other information.

Derived: A derived attribute is dependent on other information including but not limited to the values of other attributes, the presence of attribute associations in the system, the state of the system, information available within the system, information available from a third party system, or combinations of the previous sources of information. Examples of such derived attributes include but are not limited to:

Logical combinations or rules: For example, assume that derived attribute $D_1$ is a combination of attribute $A_1$, attribute $A_2$, and attribute $A_3$ where R is connected to these attributes via the Boolean expression $D_1=A_1$ AND ($A_2$ OR $A_3$). This means that $D_1$ is TRUE if $A_1$ and either of $A_2$ or $A_3$ is TRUE; and FALSE otherwise. Then $D_1$ is a logically-derived attribute.

Inference-based rules about a set of attributes: For example, assume that the number of total members of the set of attributes associated with loop L is N and a threshold $N_T$ exists. $D_2$ is a derived inference-based attribute whose value is dependent on N relative to $N_T$. If $N>N_T$, $D_2$ is TRUE, otherwise $D_2$ is FALSE.

Inference-based rules about the set of participants: For example, assume that the set of participants with visibility to loop L is S and participant 'Alex' is A. $D_3$ is a derived inference-based attribute whose value is dependent on whether $A \notin S$, that is, Alex is not an element of S. If $A \notin S$, $D_3$ is TRUE, otherwise $D_3$ is FALSE.

Inference-based rules about a particular participant: For example, $D_4$ is a derived inference-based attribute which depends on the number of loops with state='open' and visible to participant P. If $\Sigma_{loops}$ (state='open' and visible to P)$>N_T$, then $D_4$ is TRUE, otherwise $D_4$ is FALSE.

Inference-based rules about the information available to the system: For example, assume U is an employee participant, S is a co-worker participant of U in an organizational chart stored in a database of a system used to implement the loop, such as database 303 of enterprise system 300, N is the number of total loops associated with U, M is the number of total loops associated to S. $D_5$ is a derived inference-based attribute, where if $N>M$, then $D_5$ is TRUE. Otherwise $D_5$ is FALSE.

Attributes defined by similar rules that utilize mathematical operators, logical operators, functions, or similar operations on information available to the system including, but not limited to, data lookups, contextual analysis, human input, dates and time, attributes, associations, or any information available to the system are considered derived attributes.

Derivation is implemented via various techniques including, but not limited to, automated techniques such as automated semantic analysis within the system used to implement the loop, such as, for example back-end processing subsystem 302 of FIG. 2; human processing; or by a combination of automated and human techniques.

The association and disassociation of an attribute to a loop may occur explicitly and directly, for example, following a user action to create a loop, or implicitly via rules, for example, as a result of changes to system information. Examples of implicit association are:

Parent attribute association: For example, assume that A is an attribute having a parent attribute B and a child attribute C. If A is associated to loop L, then B shall be associated to L as a derived parent attribute.

Child attribute association: From the previous example, if A is associated to loop L, then C shall be associated to L as a derived child attribute of L.

Attribute-set association: For example, assume that attribute set S is composed of attributes $\{S_1, S_2, \ldots S_N\}$ and a subset of S associated with L satisfies criteria C, then S shall be associated to L as a derived set attribute of L.

Existence association: For example, assume that derived attribute $D_2$ from the example above exists and is 'true' for loop L, then $D_2$ shall be associated to loop L as a derived attribute of L.

Rule-based association: For example, attribute $D_3$ from the example above shall be associated to loop L only during the hours of 8 am to 5 pm EST.

Event-based association: For example, derived attribute D shall be associated to loop L upon event E occurring within the system.

A facet is a set or collection of attributes organized around a common theme or purpose. A facet serves as both an organizational tool for a user of the system and to drive behavior, for example, when associated by a derived attribute. A facet is typically defined by a common category or theme.

The attributes belonging to a facet are, for example:
unorganized (a simple collection),
organized according to different methods in form of a graph, which include but are not limited to: ordered sets, multi-parent trees, or directed acyclic graphs.

An attribute may be part of more than one facet. Facets may be orthogonal to one another. Examples of facets and their corresponding attributes are presented in Table 1. In Table 1,
a tab implies a hierarchical relationship,
italics signifies a parent attribute with children, and
[brackets] signifies an attribute categorized into more than one parent

TABLE 1

Facet and Attribute Examples

Figure 4B:
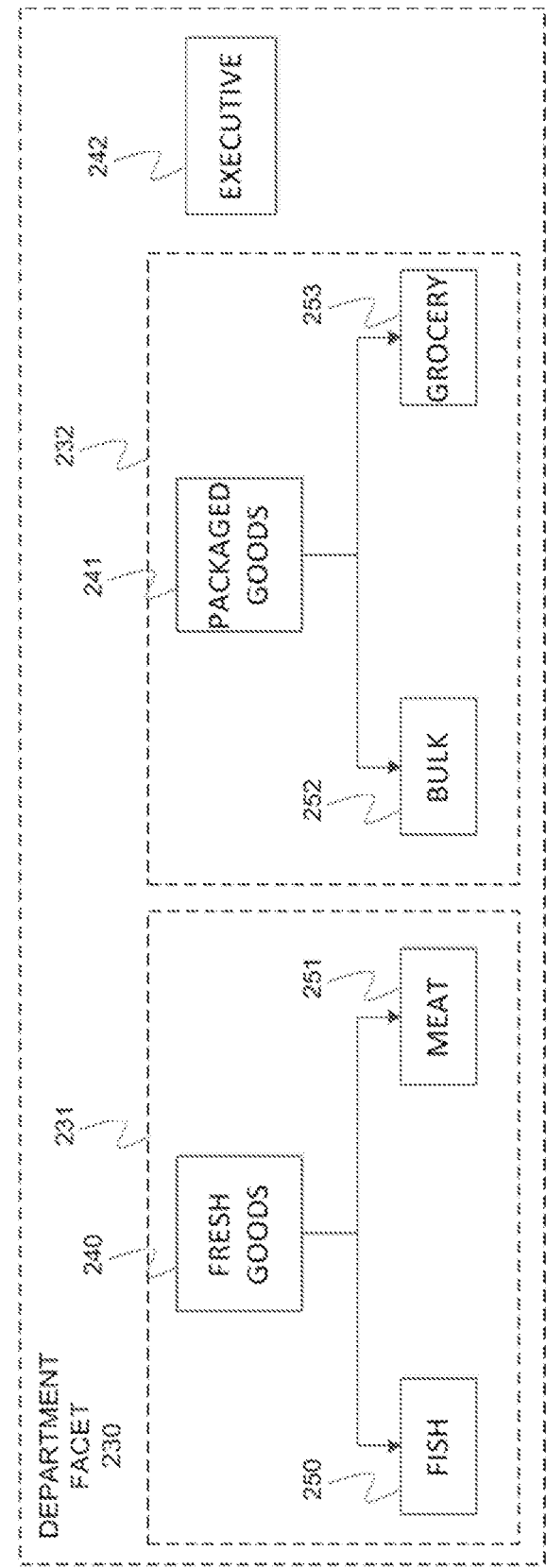
FIG. 4B shows relationships within the Department facet of Table 1.

| Facet Example | Attribute Example | Description |
|---|---|---|
| Physical Location | All Stores Northern Stores Kanata Nepean Eastern Stores Barrie | These relationships within the "Physical Location" facet are depicted in FIG. 4A. The "Physical Location" facet shown in FIG. 4A has attributes 200 including an overall parent attribute 201 "All Stores". The overall parent attribute has two children attributes, which are non-overlapping attributes based on region, "Northern Stores" (210) and "Eastern Stores" (211). Each of these attributes have children attributes based on store locations. "Northern Stores" (210) has "Kanata" (220) and "Nepean" (221) as children attributes. "Eastern Stores" (211) has "Barrie" (222) as a child attribute. |
| Department | Fresh Goods Fish Meat Packaged Goods | The relationships in the Department facet are depicted within the collection of attributes 230 of FIG. 4B This facet has two disjoint trees 231 and 232 and an unconnected attribute 242. Tree 231 has a |

TABLE 1-continued

Facet and Attribute Examples

Figure 4C:
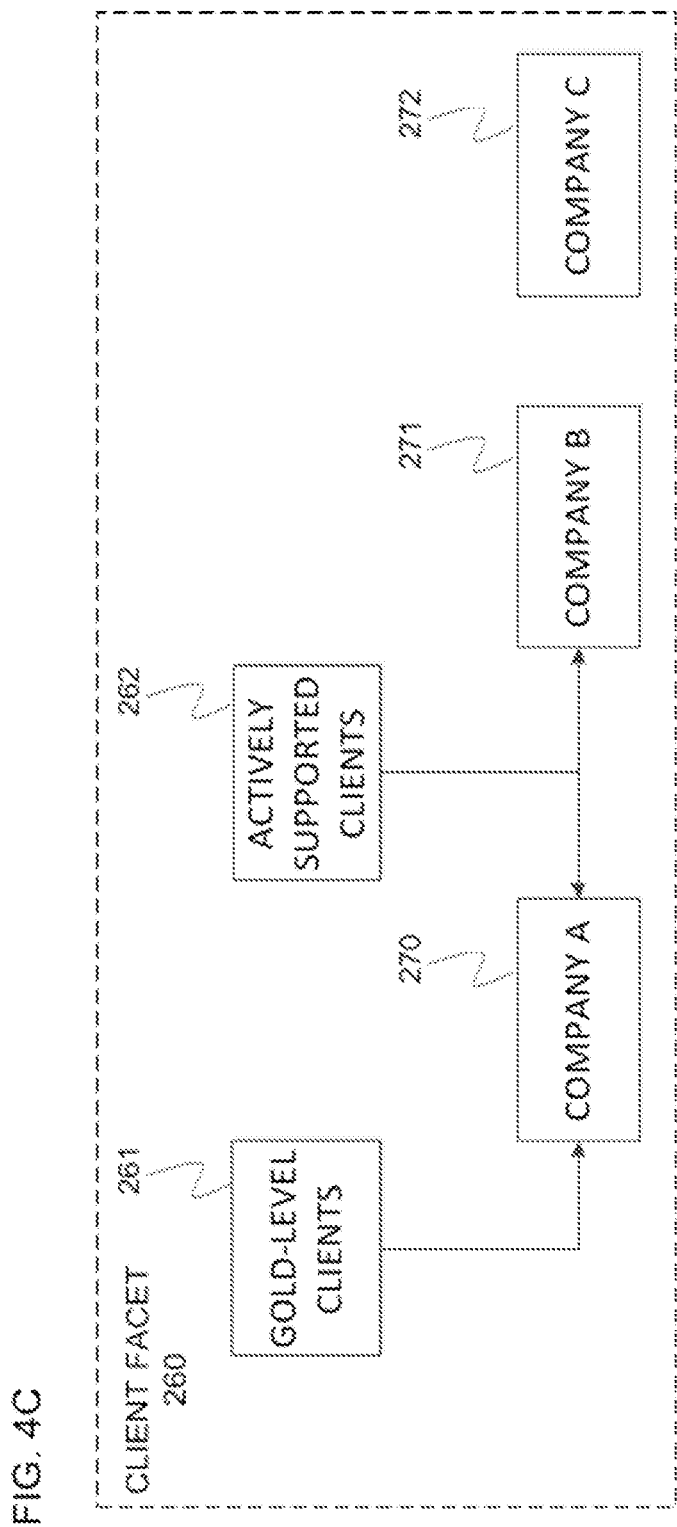
FIG. 4C shows relationships within the Client facet of Table 1.

| Facet Example | Attribute Example | Description |
| --- | --- | --- |
| | Bulk Grocery Executive | parent attribute, "Fresh Goods" (240) and tree 232 has a parent attribute "Packaged Goods" (241). These parent attributes have children. Fresh Goods 240 has children "Fish" 250 and "Meat" 251. Packaged Goods 241 has children "Bulk" 252 and "Grocery" 253. The Executive attribute 242 is unconnected to the trees 231 and 232 but part of the facet for organizational purposes. |
| Sentiment | Good Bad | The facet has two attributes - "Good" and "Bad" . There are no parent-child relationships. |
| Client | Gold-level Clients A Company Actively Supported Clients [Company A] [Company B] [Company C] | The relationships in this example "Client" facet are depicted within attributes 260 of FIG. 4C. FIG. 4C shows an example of attribute 'Company A' 270 having two parents, namely the designations 'Gold-Level Clients' 261 and 'Actively Supported Clients' 262. 'Company B' 271 has 'Actively Supported Clients' 262 as its only parent, and 'Company C' 272 has no parents at all but is included in this facet for organizational reasons. |
| Tags | New Store Urgent Follow-up Employee Performance Issue | The "Tags" facet contains several attributes. There are no parent-child relationships. |

A facet contains attributes from the one or more loops being implemented by a system, such as enterprise system 300 of FIG. 2.

In one implementation, facets are stored in a database of the system used to implement the one or more loops, such as database 303 of enterprise system 300 of FIG. 2. Then a subsystem within the system used to implement the loop such as back-end processing subsystem 302 of enterprise system 300 of FIG. 2 retrieves and uses these facets, for example, to consider other attributes for association in a loop.

The Routing Rule

Routing rules are used to determine which attributes are followed by a participant, and consequently whether loops are visible to a specific participant. An attribute is determined to be a routing attribute when it is configured into one or more routing rules, which and is therefore used in routing decisions. Referring to FIG. 3, the routing attributes are 122, 123 and 124 as they are configured into routing rules 131-133. Attribute 125 is not directly associated with any routing rules, and is therefore not determined to be a routing attribute in this state. Configuring routing rules using attributes occurs explicitly, implicitly, or via a combination of explicit and implicit techniques. Similarly, configuration occurs via automated techniques, human techniques or via a combination of human and automated techniques.

Routing attributes which satisfy a participant's routing rule are said to be followed by that participant, that is, when those routing attributes are inputted into the routing rule the output TRUE is returned. If a participant follows a routing attribute which is a part of a loop, then the loop will be visible to the participant. The set of participants for a given loop is determined by a participant's routing rules, the then associated routing attributes, and the then associated loop(s). Participants are associated with, or "follow" routing attributes through routing rules.

For example, referring to FIG. 3, routing attribute 122 satisfies participant 141's routing rule 131. Then participant 141 'follows' routing attribute 122. Since routing attribute 122 is associated to loop 100, therefore loop 100 is visible to participant 141. Similarly participant 142 follows routing attribute 123 through routing rule 132, and routing attribute 123 is part of routing loop 100. Therefore loop 100 is also visible to participant 142. Routing rule 131 directly associates routing attribute 122 to participant 141, whereas routing rule 132 is used by both participants 142 and 143. Unlike routing rule 131 and 132 which both reference only a single attribute, routing rule 133 references two attributes (123 and 124) to derive its value. Similarly, participant 143 references two routing rules to provide loop visibility. As routing rule 133 is satisfied for loop 100 based on the existence of routing attributes 123 and 124, with attribute 124 also deriving its value in part from attribute 125, participant 143 has visibility of loop 100. Attribute 125 is not currently being used for routing purposes, and is therefore determined an attribute 120 and not specifically a routing attribute 121. Collectively loop 100 is considered visible to participants 141, 142, and 143. The data 110 including data 111 and data 112 are therefore visible to participants 140 if said data satisfies the permissions of the respective participant.

Should a change to any attribute, routing rule, or association result in a loop becoming visible to a following participant, then such a participant is said to have gained visibility to that loop.

In some implementations of the present disclosure, participants set routing rules for themselves. In an alternate implementation, routing rules are set by the organization for each participant. In another implementation, routing rules are derived from the groups a participant is in. In another implementation, routing rules are set implicitly. In yet another implementation, routing rules are set explicitly. In yet another implementation, routing rules are set both implicitly and explicitly.

In one implementation, routing rules are stored in a database of the system used to implement the loop, such as database 303 of enterprise system 300. Operations to determine whether a routing attribute satisfies the routing rules of a participant are carried out by a subsystem within the system used to implement the loop, such as back-end processing subsystem 302 of enterprise system 300.

In one implementation, a routing rule is a Boolean function which includes routing attributes as input variables, and logical operations are performed on the routing attributes to determine the value of the function. Using the attributes "Kanata", "Nepean", and "Fish" for illustrative purposes, examples of individual routing rules RR1, RR2 and RR3 below are evaluated using Boolean operations:

RR1: ("Kanata")—this means that the presence of attribute Kanata satisfies RR1. Put another way, if the attribute "Kanata" is associated with an initiated loop, RR1 is satisfied and the participant 140 associated with RR1 will be granted visibility to the loop and its associated information and/or data.

RR2: ("Kanata" AND "Nepean")—this means that both attributes Kanata and Nepean must be present to satisfy RR2.

RR3: ("Kanata" AND "Fish" AND NOT "Nepean")—this means that both attributes Kanata and Fish must be present, and attribute Nepean must not be present to satisfy RR3.

In one implementation, a participant has multiple routing rules that are combined into a visibility test to evaluate visibility rights to a given loop using logical operations. A visibility test for a participant using rules RR1, RR2 and RR3 is, for example:

Visibility Test=(RR1) OR (RR2) OR (RR3)

This means that either one of these rules must be satisfied in order for the participant to gain visibility of the data and/or information associated with the loop 100.

Figure 5:
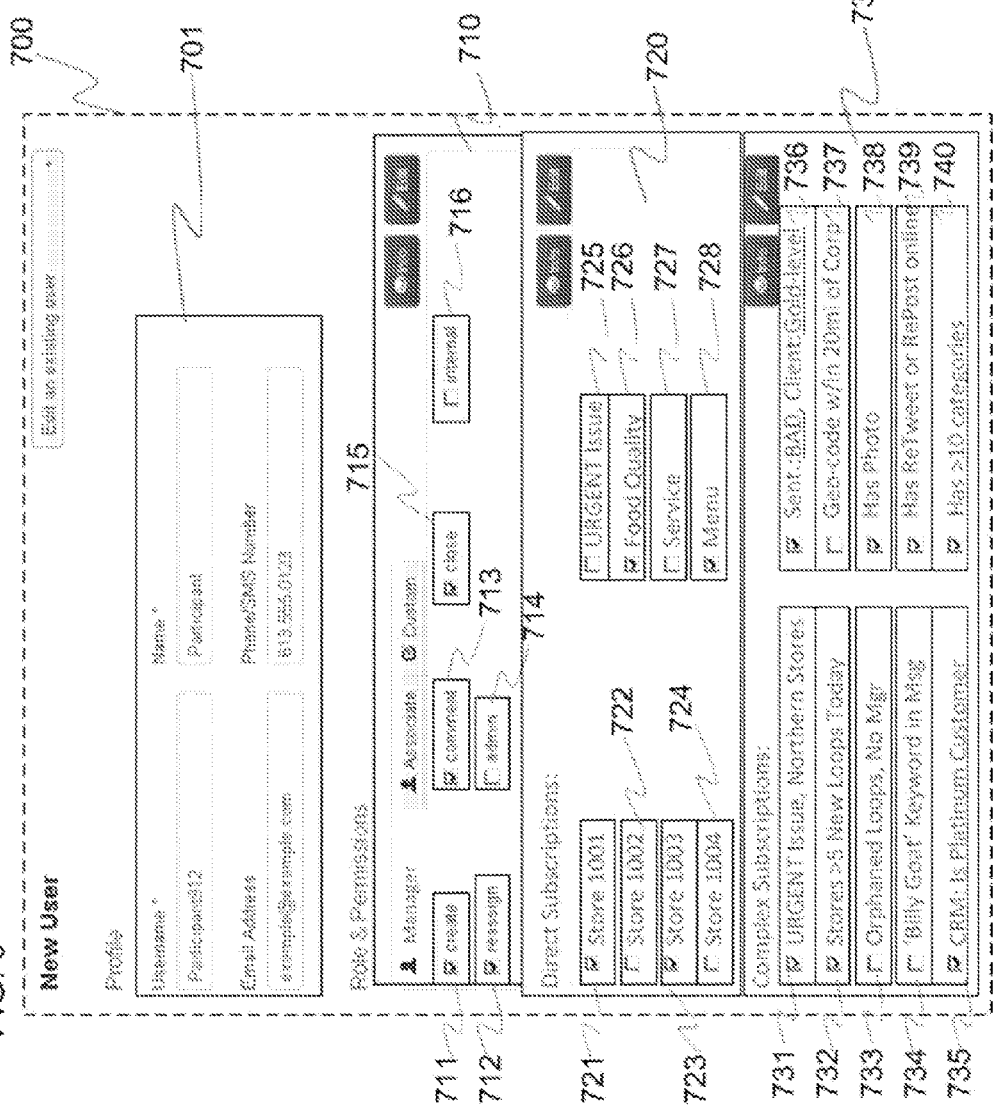
FIG. 5 shows an example participant profile interface.

In one implementation, the routing rules and associated attributes that a participant follows are stored in a participant profile. FIG. 5 shows an example participant profile interface 700 that includes participant information 701, permissions 710, routing rule subscriptions 720 and 730.

FIG. 5 shows sections 720 and 730 from a web page displayed on, for example, a browser running on device 310 of FIG. 3 for a participant to set routing rules. The client can tick one of the checkboxes 721-728, and each of the checkboxes corresponds to a routing attribute. Routing rule 721 corresponds to following the attribute 'Store 1001' which would provide visibility to all loops tagged with the 'store 1001' attribute. Similarly for routing rule 722-724. The participant here is following only store 1001 (721) and store 1003 (723). Routing rule 725 corresponds to the independent attribute label 'URGENT,' 726 label 'Food Quality', 727 the 'Service' facet and all related child attributes, and 728 the 'Menu' facet and all related child attributes. If the client ticks more than one of the checkboxes, then the rules are Boolean ORed with each other, that is, the rules are evaluated in parallel and used collectively to determine loop visibility.

Section 730 of FIG. 5 shows the assignment of more complex routing rules participant 701. The routing rules in 730 capture, for example: any loops with an 'URGENT' tag and who have a child attribute or the Northern Stores facet (731); loops with a tag from the 'Store' facet and which today have seen the creation of more than 5 loops (732); loops with no participants associated via an 'owner' attribute (733); loops wherein the 'message' data contains keyword 'Billy Goat' (734); loops whereby a remote customer relationship management (CRM) system reports the associated loop initiator is also a platinum customer (735); loops with a 'BAD' tag attribute and whereby a remote database reports the loop initiator a Gold-level client (736); loops where the latitude/longitude attributes fall within a geographic virtual fence defined by a 20-miles radial arc around a fixed location (737); loops in which one of the associated data elements is of type photo (738); loops in which an external social media engine reports 'retweeting' or 'reposting' of comments online (739); and loops in which the associated independent attributes of the category facet number more than 10 (740). Selected complex subscriptions 730 are similarly ORed together with other enabled routing rules.

In another implementation, the routing rules that a participant follows are stored as references from the participant's profile to those routing rules, and respective opposite references from those routing rules to the participant's profile. For example, referring to FIG. 3, the participant profile for participant 142 includes routing attribute 123 via routing rule 132. In one implementation, the participant profile is stored in a database of the system used to implement the loop, such as database 303 of enterprise system 300.

In one implementation, information on which attributes are configured into routing rules are stored by the system used to implement the loop in, for example, database 303 of enterprise system 300 in FIG. 3.

Figure 6:
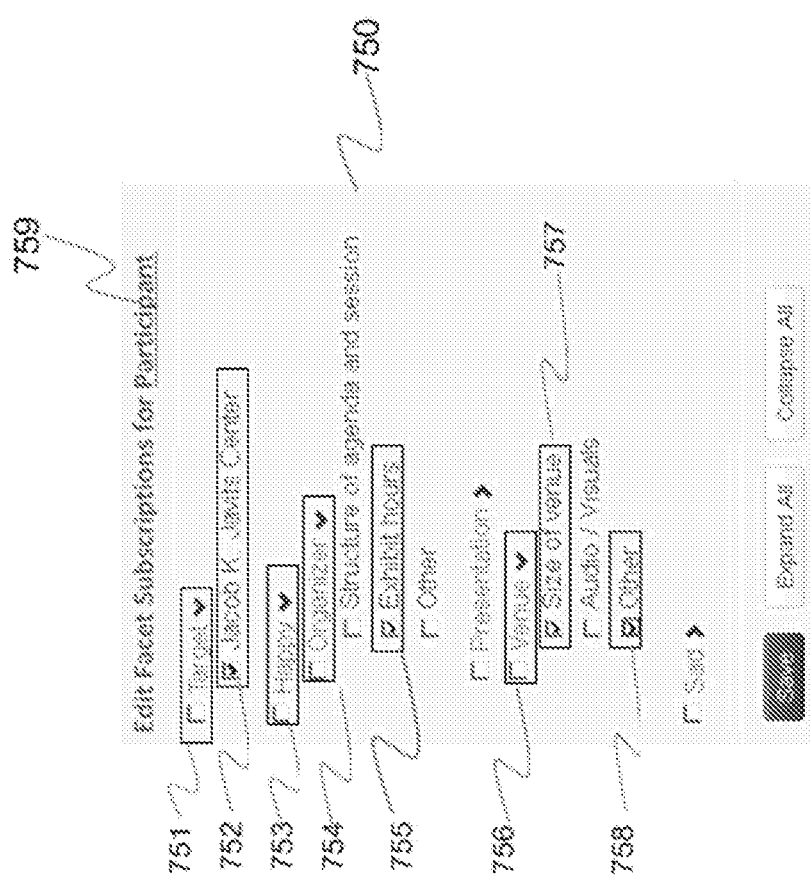
FIG. 6 shows an interface that displays available attribute facets according to some implementations of the present concepts.

In one implementation, routing rules are assigned to a participant 759 via a hierarchical interface 750 that displays available attribute facets as shown in FIG. 6. In this case, facets include a "Target" facet 751 with a single visible attribute "Jacob K. Javits Center" 752. That attribute 752 is checked indicated participant 759 has a routing rule that is "following" said attribute. Similarly, a tree facet 753 with root attribute "Happy" contains a three sub-trees "Organizer" 754, "Presentation", and "Venue" 756. Participant 759 is "following" attribute "Exhibit Hours" 755, "Size of Venue" 757, and "Other" 758. Based on these assigned routing rules 750 and the participant's 759 permissions, loops associated with one or more 'checked' attributes will be visible to said participant.

The Participant

A participant is, for example, a user, a remote system, a third party device, or a similar external entity with visibility of a particular loop. Referring to FIG. 1, visibility of a loop by a particular participant is determined through the connections between a loop 100, its attributes 120, and the routing rules 130 associated to the participants 140.

FIG. 3 shows the connections between participants 140 and loop 100, data 110, attributes 120 and routing rules 130. The loop 100 has participants 140 consisting of individuals 141, 142 and 143. A participant includes, but is not limited to, an individual, a 3rd party system, or a group of individuals. Participants may become associated to the loop upon its creation, or may become associated at any future time based on changes made to the loop.

An initiator is the participant that originally triggered the loop. In FIG. 3, the initiator of loop 100 is participant 141. The initiator may be any individual or third party system, for example, a visitor, a customer, an employee, an investor, a supervisor, a manager, a third party system or remote device. A loop is triggered by an initiator wanting to raise a particular message or topic for information, for feedback or for discussion. In one embodiment, a loop is triggered directly by an initiator, that is, where the initiator is unassisted. In another embodiment, a loop is triggered indirectly, that is, the initiator triggers the loop with the assistance of another person, for example, an employee. In the case of indirect initiation, a loop can be initiated passively, that is, where a person creates the loop only at the behest of an initiator; or proactively, that is, where a person notices an issue the initiator would have created a loop for but has not yet created the loop.

A loop can also be initiated by a SMS/MMS message, an email message, a transcribed hand-written message, visiting a URL (going to a URL automatically initiates a loop, no other inputs required), a website form submission, a microblog update message from a social networking site, such as, for example, Facebook® or Twitter®, a voice message from a call in number, a video message, a machine interface, through an API, or similar forms. These messages may contain text, images, audio, video, documents and other file formats.

If the initiator 141 uses an SMS message to initiate a loop, in one implementation, the initiator sends an SMS message to a generic phone number. The initiator then goes through a simple interactive response flow (for example, via SMS messages) to define the attributes and facets such as location. For example, the system may send the initiator a return SMS message reading "Reply 1 for downtown store, 2 for Broadway store." The initiator can then send a reply to specify the option, and the relevant information is passed to the system to initiate the loop. In another implementation, the system may reply "Please visit example.com/1234 to select your location." The initiator can then use the specified website to indicate the location and issues faced, and the relevant information is passed to the system. In another implementation, the initiator sends an SMS message to a pre-defined phone number, which may be tied to one or more attributes and facets such as specific locations and/or specific issues. Then when the user sends the SMS, this information is added to the SMS and forwarded to the system to initiate the loop. In one embodiment, attributes and facets are preselected based on the initiator's phone number, the time of the day, and other similar contextual information.

In another implementation, as described above the initiator 141 can use an email message to initiate a loop. Similar to the SMS 0 specific email address to initiate the loop. Similarly, the system may send an email reply to the initiator directing the initiator to a website.

In another implementation, the initiator 141 initiates a loop by creating a microblog update on a social networking site, such as, for example, Facebook®, Twitter®, LinkedIn® or Pinterest®. In one implementation, a system such as that described in reference to FIG. 1 of U.S. patent application entitled "System for Extracting Customer Feedback from a Microblog Site," assigned Ser. No. 13/458,527, filed Apr. 27, 2012, which is commonly owned by the assignee of this application, and which is hereby incorporated by reference herein in its entirety, can be used to identify and act on actionable microblog updates. Similar to FIG. 1 of U.S. patent application Ser. No. 13/458,527, this process includes four stages: retrieval, filter, learning, classification and action.

In the retrieval stage of the process, microblog updates matching a certain retrieval criteria are captured. The retrieval criteria can include messages containing designated keywords posted by a microblogger, messages with location metadata information (e.g., especially ones that are at or close to known locations that are of interests to the businesses) or messages with other multimedia information attached. The microblog updates could come from, for example, a direct feed from the social networking site, or by "scraping" updates from the social networking site.

In the filter stage of the process, at least one criterion can be used to remove irrelevant microblog updates and "spam." After filtering, the filtered microblog updates are then moved to the learning stage of the process, where prioritization takes place. In the prioritization process, a probability is assigned to the microblog update to indicate the confidence that the microblog update is actionable. Based on this probability, a priority can be assigned to the microblog update. Prioritization is carried out based on at least one prioritization criterion, such as popularity of the microblogger; influence of the microblogger; time differential between the event and the microblog update posted as a consequence of the event which caused the concern; and geographical proximity of the microblogger to the business where the event took place.

The prioritized microblog updates are then moved into the classification stage of the process, where microblog updates are classified as actionable or not. Classification may be partially implemented using, for example, a website such as that shown in the section titled "Detailed Description of the Classification Stage" and in FIGS. 2-9 of U.S. patent application Ser. No. 13/458,527, which was previously incorporated by reference herein in its entirety. Finally actionable microblog updates from the classification stage are directed to the action stage of the process, where these microblog updates are acted upon. A similar process can be applied to reviews from websites, such as, for example, Yelp®, TripAdvisor®, etc.

In another implementation, the initiator 141 can send a chat message to a chat client using instant messaging software, such as, for example, WhatsApp®, Google® Talk®, BlackBerry® Messenger or Skype® utilizing protocols such as Session Initiation Protocol (SIP), Extensible Messaging and Presence Protocol (XMPP), and other communication protocols. This chat message can be used to initiate a loop.

As explained above, in another implementation, the initiator 141 can initiate a loop by calling a call-in number and leaving a voice message. Then, a loop can be created automatically using, for example, speech-to-text conversion technology. Alternatively, the received call and/or voice message can be delegated to a call center to create a loop on behalf of the initiator. Similar to the email and SMS message implementations described herein, an initiator can call a generic phone number or a specific phone number. In the latter case, some attributes and facets may be preselected based on the number used and automatically included when the loop is initiated. Attributes and facets can also be preselected based on the caller ID, the time of the day, and other similar contextual information.

In another implementation, the initiator 141 can initiate a loop by calling a call-in number and engaging with an interactive voice response (IVR) system. In one embodiment, the number is generic, and the initiator has to select the location and or issue using, for example, a touch-tone phone. In another embodiment, the number is specific to the location. In such embodiments, for example, the initiator is directed to an appropriate operator who initiates the loop on behalf of the initiator.

In another implementation, the initiator 141 can send a video message or start a video conference. The video message or video conference can be used to initiate a loop. Additional metadata and contextual information related to the video message or video conference can be used to pre-select attributes and facets for the loop.

A loop is initiated, for example:
By a customer, to
  Provide feedback.
  Issue service request and track closure.
  Raise issues, such as customer service or safety issues.
  Praise employees for outstanding work.
By an employee, to
  Initiate an action or discussion between staff internally.
  Internally raise issues or seek information from the organization.
By an individual needing to, for example, communicate with an organization without necessarily having awareness of specific individuals (and their respective contact emails, addresses, or phone numbers) within an organization.
By an individual or system, for example, to initiative a collaborative effort or discussion between participants on a particular topic or issue, where the participants are associated by common purpose but are not necessarily associated through a common, business, corporation, or organization.
By a system, to drive staff action or awareness. For example, in one implementation, a system is pre-programmed to trigger a loop in response to a customer providing negative feedback. In another example, a system monitoring the public internet for pertinent information is pre-programmed to, upon detection of such information, trigger a loop to involve appropriate staff members to discuss and act on this information.

Figure 7:
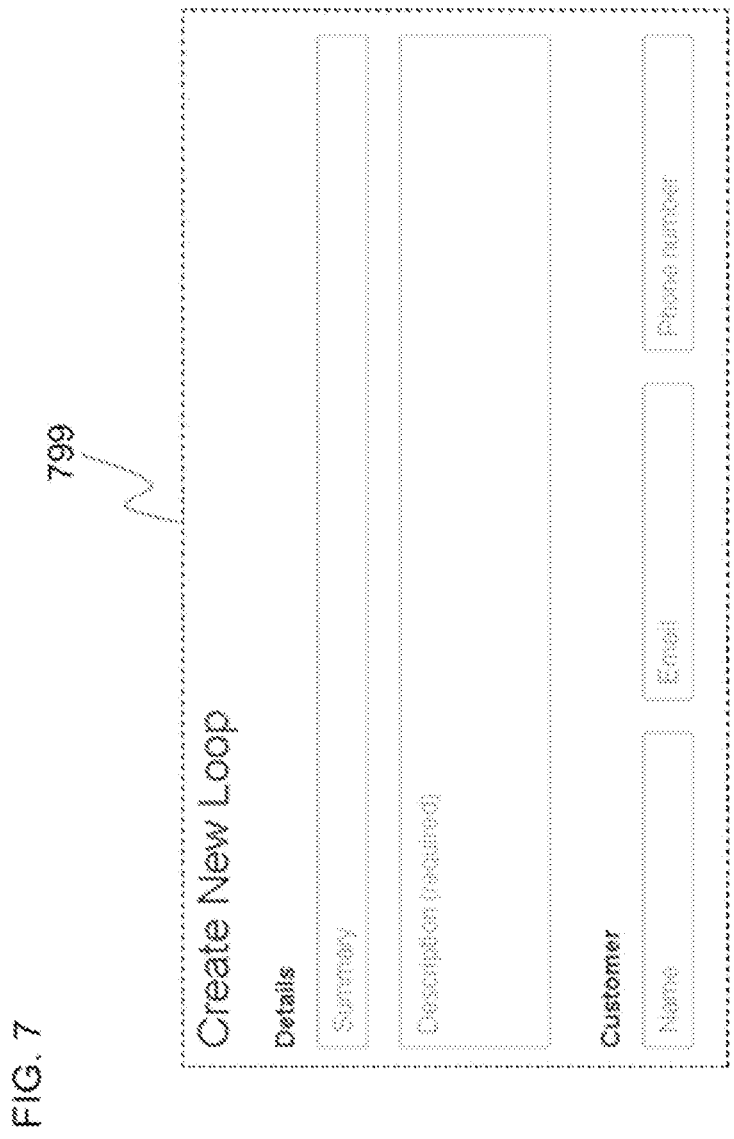
FIG. 7 shows an interface to create a new loop.

In one implementation, initiator 141 can initiate a loop from a web interface such as section 799 of FIG. 7. In another implementation, the initiator 141 defines loop data 110 and attributes 120, by, for example, indicating appropriate data on an optional section of the same web page as section 799 of FIG. 7, or on a web page linked to section 799 of FIG. 7. The web page is displayed on a web browser running on device, for example, device 310 of FIG. 2. The initiator 141 uses the web page to send instructions to enterprise system 300 to configure attributes into routing rules via front-end server 301. The web interface may reside, for example, on a generic website or on a website with a predefined Uniform Resource Locator (URL) that contains encoded attribute information. In the case of the generic website, the user selects attributes such as specific issues and the location corresponding to that of a store or outlet. In the case of the website with a predefined URL, the web interface may already contain some preselected attributes and facets, some of which can be displayed to the user. In some implementations, visiting the predefined URL initiates the loop automatically with predefined attributes and facets without requiring any additional input from the initiator 141.

In another implementation, an initiator 141 may initiate a loop by scanning a two-dimensional barcode (for example, a QR code) using a mobile device such as a smartphone or a tablet (for example by using an application on the smartphone or a tablet or using a built-in camera of the smartphone or a tablet), which then takes the initiator to the generic website or the website with a predefined URL. In the case of a generic website being used, the initiator can provide additional information on the website. In the case of a predefined URL being used, some attributes and facets are preselected. In some implementations, visiting a predefined URL via QR code initiates the loop automatically. Alternatively, the initiator 141 may use other similar communication protocols employing, for example, near field communication (NFC), radio frequency identification (RFID) or Bluetooth, to take the initiator to the generic website of the website with a predefined URL.

In some implementations, an initiator 141 initiates a loop using an application or "app" running on a mobile device running one of Apple® iOS®, Android® or other mobile operating system.

Permissions and Preferences

As described above, visibility of a loop for a participant is based on attributes and routing rules. In addition to granting visibility based on satisfying routing rules, permissions associated with a participant can drive visibility to the data and/or the information associated with a loop. For example, a participant's notification preferences (e.g., permissions) can be used to change what would otherwise be visible to the participant.

Permissions for a participant include but are not limited to data visibility permissions, action permissions and reassign permissions. Action permissions control a participant's ability to
   add,
   modify, or
   remove data or attributes from the loop.
Examples of action permissions include:
Create permission—enables creation of new loops
Administration permission—enables changes to system configuration
Comment permission—allows new data of the 'public comment' type to be created and linked to the loop
Close permission—allows the closing of loops
Internal permission—allows new data of the 'internal note' type to be created and linked to said loop.
Data visibility permissions control, a participant's ability to, for example,
   view data in a loop,
   be allowed to receive notifications of changes to data of a loop. For example, in FIG. 1 participant 142 with visibility to loop 100 would require appropriate data visibility permissions to view data 111 and 112, and similarly would require action permissions to modify said data or add new data.
   reassign permissions allow associations with routing attributes to be viewed, added or removed from said loop.

In one implementation, every piece of data in the loop has both action and data visibility permissions attached to it when it is created. For example, if someone writes a new message, both action and data visibility permissions are attached to the message, to control who can view it, modify it after creation, remove it and add to it. In another example, if 3 high level managers within a loop wanted to talk about something in the loop, but only among themselves, then they would create messages and set data visibility permissions for these messages so that only the other high level managers could view it or receive notifications.

In another implementation, a type of data may have the same permission attached to it, and when a new piece of data of the same type is added, this piece of data has the same permission as the rest of the data with the same type. For example, an administrator has permission to view all participant profiles. If a new participant joins the loop, then the administrator has permission to view the new participant's profile.

If a new loop is created with new attributes and participants, new data will be created including information about the loop, such as participants, number of participants, attributes, time open, time closed, routing map, routing tables etc. This new data has action and data visibility will then have permissions attached to it.

In another implementation, the data and visibility permissions are attached to the participants 140 and based on properties of the data 110 rights to specific data are determined at that time.

Permissions are used in conjunction with routing attributes and notification settings for routing messages and other data. In one implementation, permissions are logical Boolean operations with routing attributes as inputs. Then when a new message is created, a Boolean expression representing permission for the message is connected. For example, a message is connected to a data visibility permission in the form of a Boolean operation which reads (HIGH LEVEL AND (KANATA OR NEPEAN)), meaning that only a high level employee in either Kanata or Nepean can read it.

In another implementation, actions and data visibility permissions are combined. For example, when a message is created, a permission which reads (HIGH LEVEL AND (NOT WRITE) AND (KANATA OR NEPEAN)), meaning that only a high level employee in either Kanata or Nepean can read it, but no one can modify it.

Notification preferences of a participant 140 control how changes within the system are communicated to said participant. Changes within the system include creation of new loops, changes to associations (data, loop, attribute, routing rule, or participant associations), addition or removal of data to a loop, changes to 3rd party data or information, changes enacted by an user or system, and changes to any information controlled by or referenced by the system. In a typical configuration, the system will notify the participant of relevant changes to any loop visible to that participant based on that participant's notification preferences.

In one implementation, permissions are assigned to a participant through a checkbox interface as depicted in section 710 of FIG. 5. For the selected participant, the create permission 711 enables creation of new loops and the administration permission 714 enables changes to system 311 configuration. In the context of any loop visible to the participant, the reassign permission 712 allows associations to routing attributes be viewed, added or removed from said loop, the comment permission 713 allows new data of the 'public comment' type to be created and linked to said loop, the close permission 715 allows the assignment of independent attribute 'state closed' to said loop, and the internal permission 716 allows new data of the 'internal note' type to be created and linked to said loop. Permissions can be explicitly assigned, implicitly assigned based on participant role or similar, or a combination of explicitly and implicitly assigned.

Figure 8:
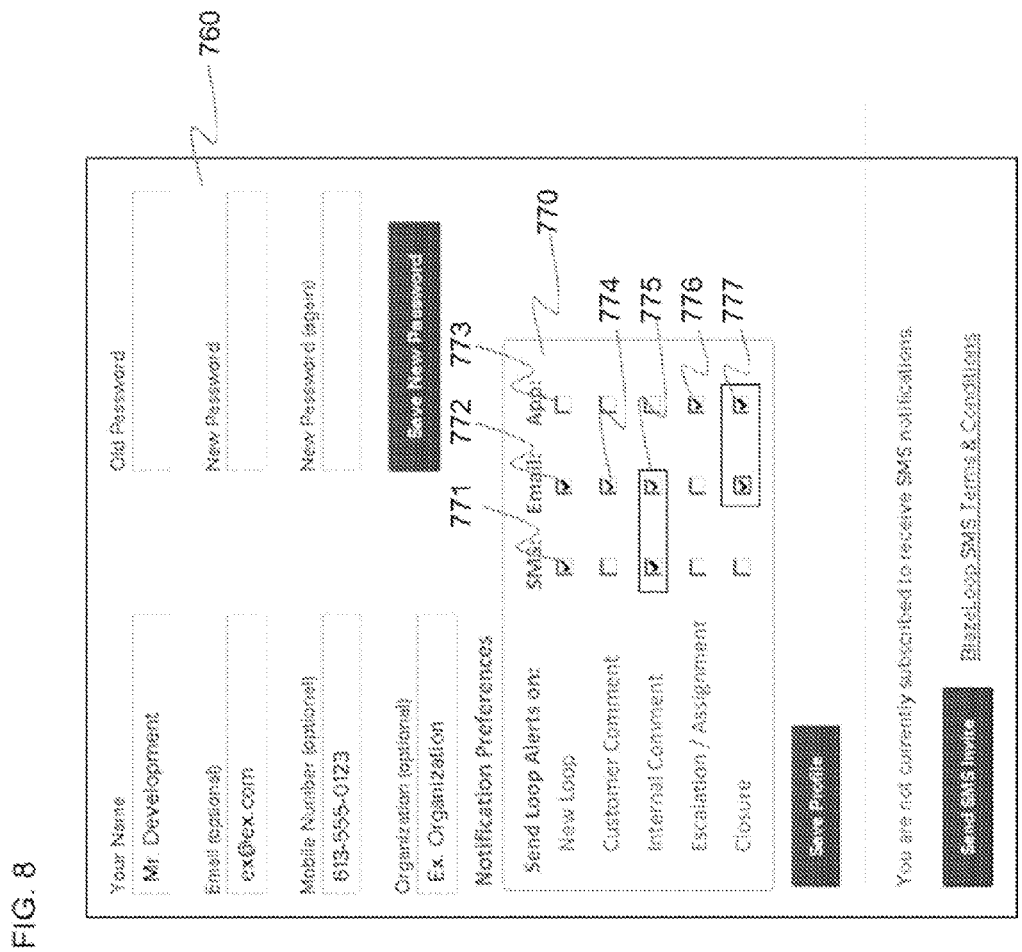
FIG. 8 shows an interface to select notification preferences for a participant according to some implementations of the present concepts.

In one implementation as shown in FIG. 8, notification preferences for the participant can be selected using interface 760. Preferences are selected by checkbox in a grid 770 based on media and event type. For visible loops, the participant will receive SMS (771), email (772), and will not receive app alerts upon new loop creation (773); will receive email alerts upon customer comment (774), will receive both email and SMS alerts for internal comments (775), will receive only app alerts upon escalation or reassignment (776), and will receive only email and app alerts upon closure of a loop (777). Additional media for alerts beyond SMS, email, and app alerts include phone calls, computer popup alerts, land-mobile radio alerts, paging messages, social media alerts, and other forms of messaging to the individual. Notifications can be sent out, for example, by notification subsystem 304 of FIG. 2. Similarly, status of such a subsystem 304 and controls to activate features of such a subsystem 304 can be displayed on the participant's profile interface 760.

Initiating a New Loop

Figure 9A:
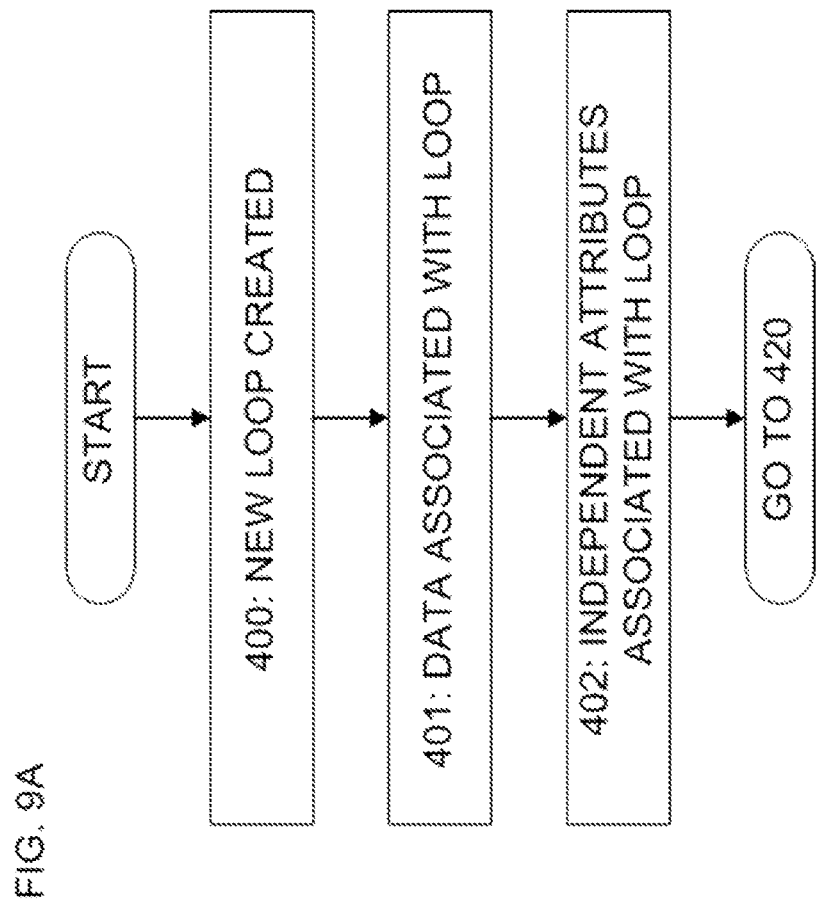
FIG. 9A shows a flowchart for the initial process for initiating a new loop after an initiator performs a triggering event according to some implementations of the present concepts.

FIG. 9A shows a flowchart for the initial process for initiating a new loop after an initiator performs a triggering event, for example, sending a triggering message, with reference to enterprise system 300 of FIG. 2. As explained previously, in a further implementation, a loop is triggered as part of the action of a larger subsystem, such as, the system of the patent titled "System for Extracting Customer Feedback from a Microblog Site", assigned Ser. No. 13/458,527, filed Apr. 27, 2012 to Du et al. For example, as part of action stage 111 of FIG. 1 of this incorporated system, a loop is triggered by an employee, the microblogger who reported the concern, or a separate internal system. In step 400, in one implementation, a new loop is created using an interface similar to interface 799 of FIG. 7. Other methods to initiate a new loop are discussed herein.

In steps 401 and 402, the data and independent attributes of the loop respectively are included by a subsystem of a system used to implement the loop, for example, back-end processing subsystem 302 of enterprise system 300 of FIG. 2, and stored in database 303 of FIG. 2. In another implementation, independent attributes are included by a participant, a supervisor or an external system. The set of independent attributes are denoted as set $A_1$.

On creation of a new loop, attributes and routing rules are used to establish which participants have visibility to said loop and notifications are sent to all visible participants respecting individual notification preferences. Any participant with loop visibility is then able to modify the data of said loop (for example, add a comment to or change an attribute of said loop) provided the action is allowed based on their action permissions. Upon recording the modification to the loop, the system in turn updates the necessary attributes, reassesses loop visibility (as necessary), and notifies all participants again respecting individual notification preferences.

Figure 9B:
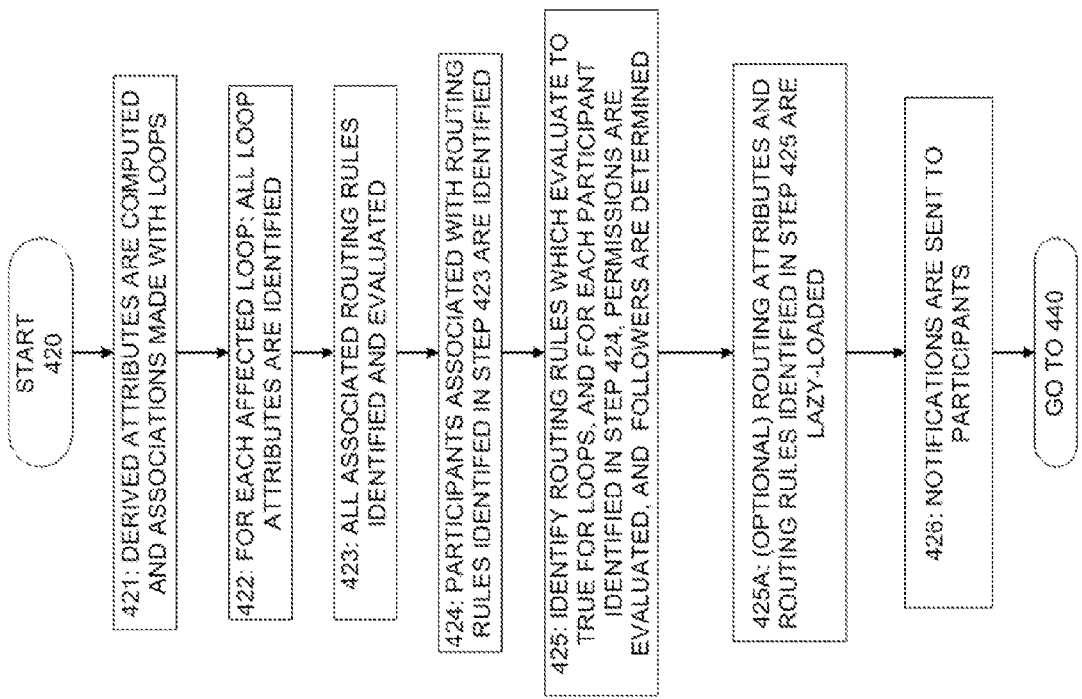
FIG. 9B shows the process flow after the initiation of a new loop and association of independent attributes within the loop according to some implementations of the present concepts.
Figure 9C:
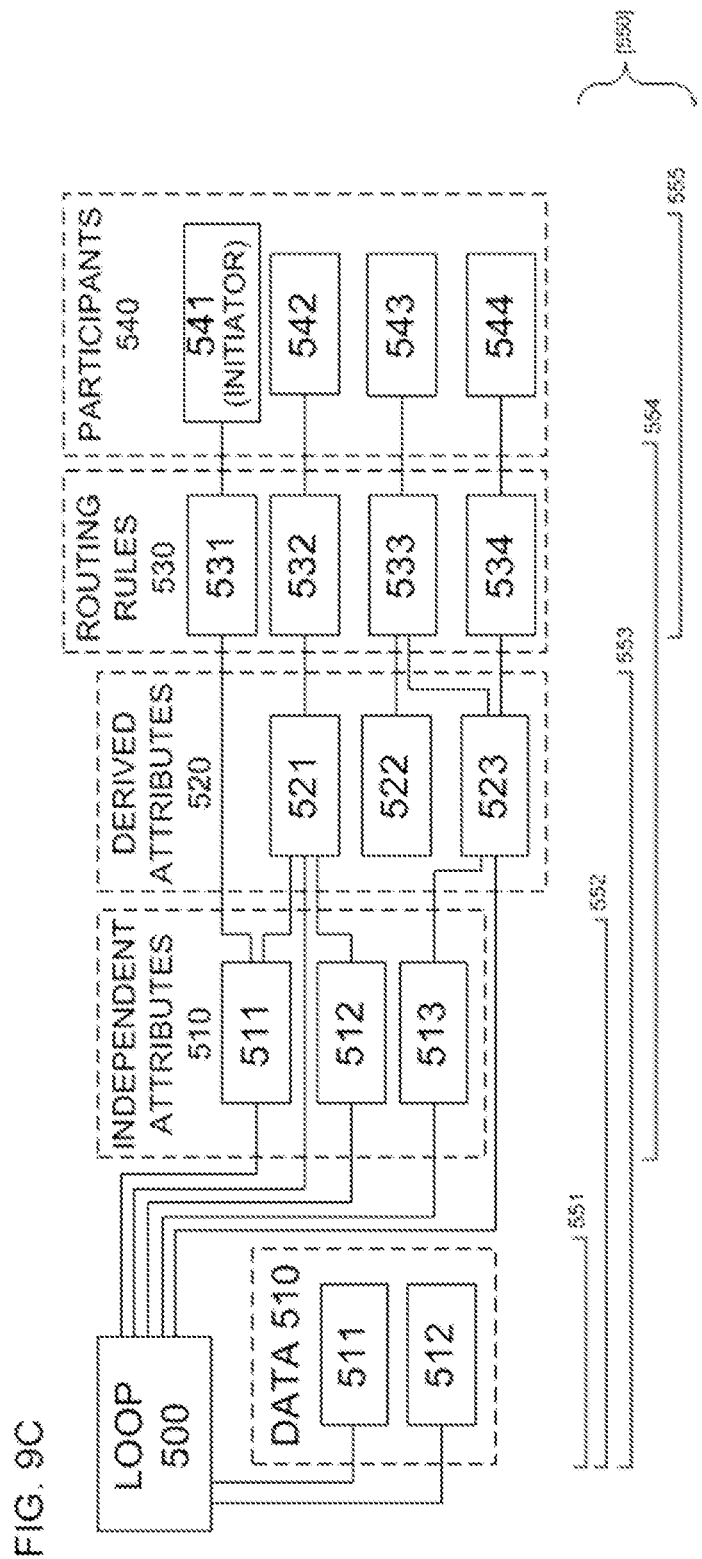
FIG. 9C is a detailed view of some of the elements of the diagram of FIG. 1 including progression of the process flow shown in FIG. 9B.

Derivation of Attributes, Determination of Visibility, Routing Rules, Participants FIG. 9B captures the process flow after the initiation of a new loop and association of independent attributes with the loop. It also captures the process flow for a situation in which a system, based on a change in the information available to the system, computes the changes to system data and loop associations that ultimately drive loop visibility and notifications to participants. Examples of information available to the system include, for example, external data from a third party system such as system 311 of FIG. 3; external data from a device 310; changes to the system or an available database 303; the system time; any attribute stored within the system; any newly updated, created, or removed associations within the system; changes to external data 128; an inbound event received or status change of the notification subsystem 304; and similar. FIG. 9C displays an example loop 500 with associated data 510 and illustrates how changing attributes affects loop visibility pursuant to the flow outlined herein.

In step 421 as shown in FIG. 9B, derived attributes are computed and associations are created, updated, or removed based on the information available to the system (including information about the independent attributes of said loop). This set of updated derived attributes is added to set $A_1$. Methods to create derived attributes from the independent attributes have been previously explained above. If the process shown in FIG. 9B is being used after a change in the information available to the system, then any necessary additional independent attributes which need to be associated with the loop are associated in this step.

In one implementation, in step 421 facets are used to determine if more independent and/or derived attributes should be included and stored. For example, if some of the independent attributes in a facet are already included in the loop, then the facet is retrieved from, for example, database 303 of FIG. 3 and other independent attributes within the facet are considered for inclusion with the loop by, for example, back-end processing subsystem 302 of FIG. 3.

In step 422, firstly all loops that are associated (directly or indirectly) with any attribute in set $A_1$ are identified (call these loops set L). Secondly, all attributes associated (directly or indirectly) with the loops of set L are identified (call this wider set of attributes set $A_2$. It should be noted that $A_1$ will be a subset of $A_2$). This set $A_2$ contains all attributes that may drive visibility.

In step 423, all routing rules that reference one or more attributes of set $A_2$ are identified (call this set R). Each routing rule in set R is re-evaluated based on the recently updated attributes $A_2$ any and any additional attributes referenced by the rule (call the even greater set of attributes here $A_3$, which is the collective set of all 'routing attributes' used by the routing rules in set R). This process is handled by, for example, back-end processing subsystem 302 of FIG. 3.

In step 424, for each given routing rule of set R, all participants associated to this rule are identified (call this set $P_1$). This process is handled by, for example, back-end processing subsystem 302 of FIG. 3.

In step 425, the routing rules which evaluate to TRUE for the loop given the attribute associations of the loop, is identified. Also, for each participant in set $P_1$, their respective notification preferences and permissions are evaluated. The subset of the participants in set $P_1$ who follow one of the routing rules which evaluate to TRUE and have appropriate permissions are identified. This subset is denoted as set $P_2$, and the participants in set $P_2$ are determined to be followers of the loops in L, that is these participants have visibility of the loops in L. In one implementation, a visibility test is used by, for example, back-end processing subsystem 302 of FIG. 3, to determine whether a participant will gain visibility to the loop.

In a further implementation, all routing attributes and their respective associations are stored explicitly. Similarly, all routing rules and combinations of attributes are stored explicitly. This design was selected specifically to provide for an 0(1) operational runtime requirement for both lookups defined above. This could pose a problem as the storage space requirements could be onerous.

To minimize this impact however, the system implements both 'lazy-storage' and 'smart pointer' concepts for routing attributes and routing rules. Only routing attributes and routing rules that are actively used to make connections between routing attributes and participants in the routing map are stored in the database, and where a routing attribute or routing rule are shared they are only stored once.

In one implementation, a further optional step 425A is carried out: Routing attributes and associated routing rules are "lazy loaded" by, for example, back-end processing subsystem 302 of FIG. 3. Under lazy loading, the routing attribute and routing rules are stored in a routing table in, for example, database 303 of enterprise system 300 of FIG. 3, only if there are one or more followers. Therefore, the routing rules identified in step 425, the associated attributes and the participants are stored in a routing table. An example of routing tables under lazy loading is presented later.

In another implementation, a reverse lookup table which shows which routing attributes and routing rules each participant follows in the loop is also created by, for example, back-end processing subsystem 302 of enterprise system 300 of FIG. 3 and stored by, for example, database 303 of enterprise system 300 of FIG. 3.

In step 426, for each participant in set P2 their notification preferences are retrieved and evaluated. Where appropriate based on permissions, notifications are sent to each participant of set $P_2$ regarding the appropriate loops of set L to which visibility has changed. In one implementation, notifications are sent by, for example, notification subsystem 304 of FIG. 3. Following step 426, the process jumps to step 440 to indicate a change in information available to the system.

To illustrate determination of visibility, shown in FIG. 9C is loop 500 with data 510 (includes, for example, a text message 511 and initial comment 512); independent attributes 510 including attributes 511, 512, and 513; derived attributes 520 including derived attributes 521, 522, and 523; routing rules 530 including rules 531, 532, 533, and 534; participants 540 including the initiator 541, participants 542, 543, and 544; and an indication of visibility 590. Scope markers 550 including 551, 552, 553, 554, and 555 correspond to the above described flow as depicted in FIG. 9A and FIG. 9B and correspond as follows:

Scope marker 551 captures steps 400 and 401 wherein a new loop 500 is created and initially only data 510 is associated with the loop.

Scope marker 552 captures step 402 wherein the independent attributes 511, 512, and 513 are first associated with the loop. Following the process outlined above, set $A_1$ contains the following members: independent attributes 511, 512 and 513.

Scope marker 553 captures step 421 wherein the derived attributes 521 and 523 are computed using the independent attributes 510 and external information. In one implementation, the external information may be obtained from back-end processing subsystem 302. Thus, following the process outlined above, set $A_1$ is updated to contain the following members: independent attributes 511, 512 and 513; and derived attributes 521 and 523.

Scope marker 554 captures step 422 and 423. In step 422, only loop 500 is identified as associated with the attributes in set $A_1$. Again, following the process outlined above, set L only contains one member, loop 500. Then in this case, set $A_2$ is the same as set $A_1$. In step 423, routing rules 531, 532, 533, and 534 are each identified based on their connections to the attributes 511, 521 and 523. Following the process above, this is denoted as set R. Since attribute 522 is referenced by routing rule 533, then following the process above, set $A_3$ is created, containing all the members of set $A_2$ and attribute 522.

Scope marker 555 captures steps 424 and 425. In step 424, the participants 541, 542, 543, and 544 identified as being associated to routing rules 530 are considered as part of set $P_1$. In step 425, routing rules 531, 532 and 534 are found to evaluate to TRUE for loop 500 given loop 500's attribute associations. Since participants 541, 542, and 544 follow these rules and have the appropriate permissions, these participants are considered as part of subset $P_2$ and have visibility of loop 500.

Optional step 425A, that is, lazy loading, is also carried out. An example routing table is shown below:

TABLE 2

Example Routing Table Under Lazy Loading for the Example of FIG. 9C

| Loop | Routing Rules | Routing Attributes | Participants |
|---|---|---|---|
| 500 | 531 | 511 | 541 |
| 500 | 532 | 521 | 542 |
| 500 | 534 | 523 | 544 |

In light of FIG. 7, the attributes, rules, and participants could be as follows:

Independent Attribute 511: Participant ID of the Initiator

Independent Attribute 512: Location "Billy Goat Island" from the target facet Independent Attribute 513: Creation timestamp "2012-11-29 4:11"

Derived Attribute 521: A flag that is set to true if participant ID of the initiator matches the ID of the owner of location "Billy Goat Island".

Derived Attribute 522: Determination that a Loop has >5 comments. As this is not the case for loop 500, this attribute is not associated with loop 500.

Derived Attribute 523: A "Needs Escalation" flag that evaluates to true when the current system time (as referenced from the back-end processing subsystem 302) less the creation timestamp (513) is between 5 and 10 hours old.

Routing Rule 531: Is Participant ID of the Initiator=3124?

Routing Rule 532: "Did the owner initiate the loop?" or more simply as "IsOwner( )"

Routing Rule 533: ">5 comments AND needs escalation"

Routing Rule 534: Is "Needs Escalation" true?

Participant 541: The loop initiator, and the owner of Billy Goat Island

Participant 542: A senior VP at the business, who "follows" any loop created by the owner of the property to provide better customer service.

Participant 543: A senior supervisor, who "follows" any loop that has a running dialog (>5 comments) and needs escalation.

Participant 544: A manager, who "follows" any loop that needs escalation.

Then the lazy loading routing table will look as follows:

TABLE 3

Example Routing Table Under Lazy Loading for the Example of FIG. 9C in light of FIG. 7

| Loop | Routing Rules | Routing Attributes | Participants |
|---|---|---|---|
| 500 | Is Participant ID of the Initiator = 3124? | Participant ID of Initiator | The owner of Billy Goat Island |
| 500 | "IsOwner( )" | Participant ID of initiator = ID of the owner of location "Billy Goat Island" | Senior VP at the business, who "follows" any loop created by the owner of the property |
| 500 | Is "Needs Escalation" true? | Needs Escalation | A manager, who "follows" any loop that needs escalation |

Changes in Information Available to the System

The process flow of FIG. 9D, beginning with step 440 captures the system's behaviour when the information available to the system is changed.

In step 441, the system identifies that information available to the system has changed, and that this change will affect one or more derived attributes 120 or routing rules 130 (step 442). If one or more derived attributes are affected, the system jumps to step 420, otherwise returns to idle.

Figure 9E:
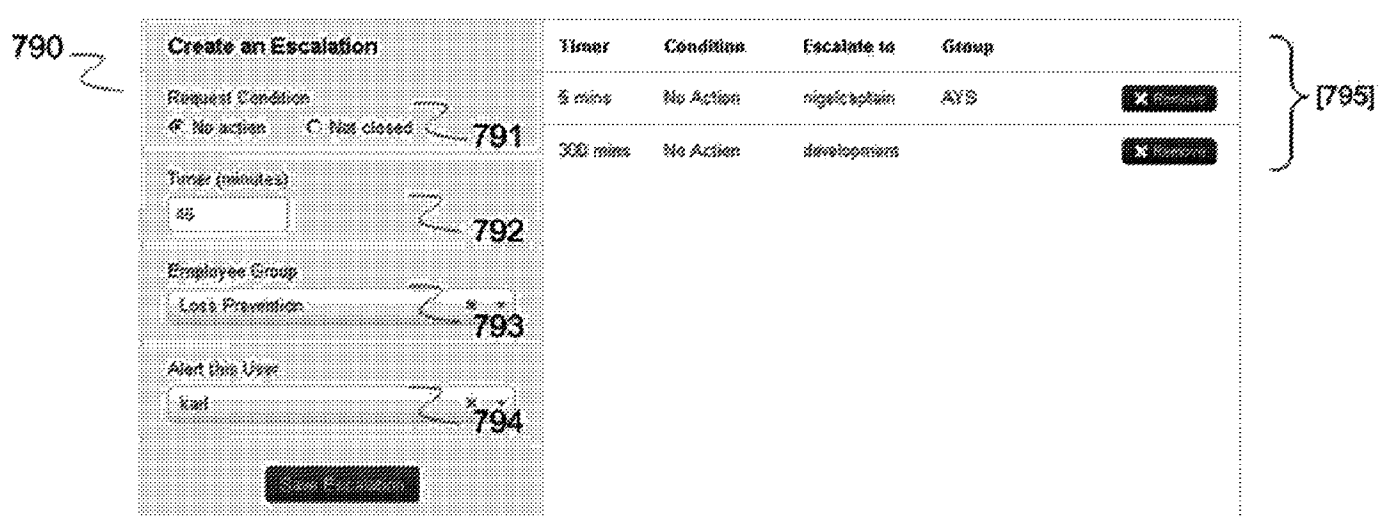

In one implementation as shown in FIG. 9E, attributes may be associated or disassociated from loops by the system 302 triggered by a change to the information available to the system. For example, in FIG. 9E, system interface 790 is used to configure escalation rules based on information available to the system such as:

That no data or attribute of the "action" or "closed" types 791 are associated to a given loop, or That the time elapsed since a given loop was created exceeds 45 minutes (792), For example, if the time elapsed since a loop was created exceeded 45 minutes, the attribute "Loss Prevention" 793 is associated with the loop, thereby making the loop "visible" to any participant with a routing rule matching "Loss Prevention", and an attribute and routing rule associating user "Karl" as the new "owner" will be created, thereby triggering notification and reassignment.

In another implementation, these further operations are carried out by participants. In yet another implementation, these further operations are carried out by a combination of participants and a subsystem within the system used to implement the loop, such as back-end processing subsystem 302 of enterprise system 300 of FIG. 3.

Another example to illustrate visibility changes is shown in FIG. 9F, FIG. 9F captures loop 500 following the addition of independent attribute 514 and passing of time. Starting with step 440 from FIG. 9C, the independent attribute 514 was associated to loop 500 by a user using, for example, device 310 from FIG. 3 and also system time has elapsed which both constitute system information has changing and trigger step 441. Steps 420 through 426 from FIG. 9B are evaluated as before, and the results, are as follows:

Independent Attribute 514: Tag "Kitchen" is associated to loop 500

Routing Rule 534: Due to time elapsed, the "Needs Escalation" condition no longer evaluates to true.

Routing Rule 535: "Is Kitchen associated with loop?"

Participant 544: Who originally had visibility to loop 500 based on routing rule 534 no longer has visibility.

Participant 545: The "Kitchen" category manager now has visibility (591) based on their responsibility for all loops regarding her department.

The lazy loading routing table now looks as follows:

TABLE 4

Lazy Loading Routing Table for the Example of FIG. 9F

| Loop | Routing Rules | Routing Attributes | Participants |
|---|---|---|---|
| 500 | Is Participant ID of the Initiator = 3124? | Participant ID of Initiator | The owner of Billy Goat Island |
| 500 | "IsOwner( )" | Participant ID of initiator = ID of the owner of location "Billy Goat Island" | Senior VP at the business, who "follows" any loop created by the owner of the property |
| 500 | Is Kitchen associated with loop? | Kitchen | The "Kitchen" category manager |

Determining Loop Visibility for Each Participant

Figure 9G:
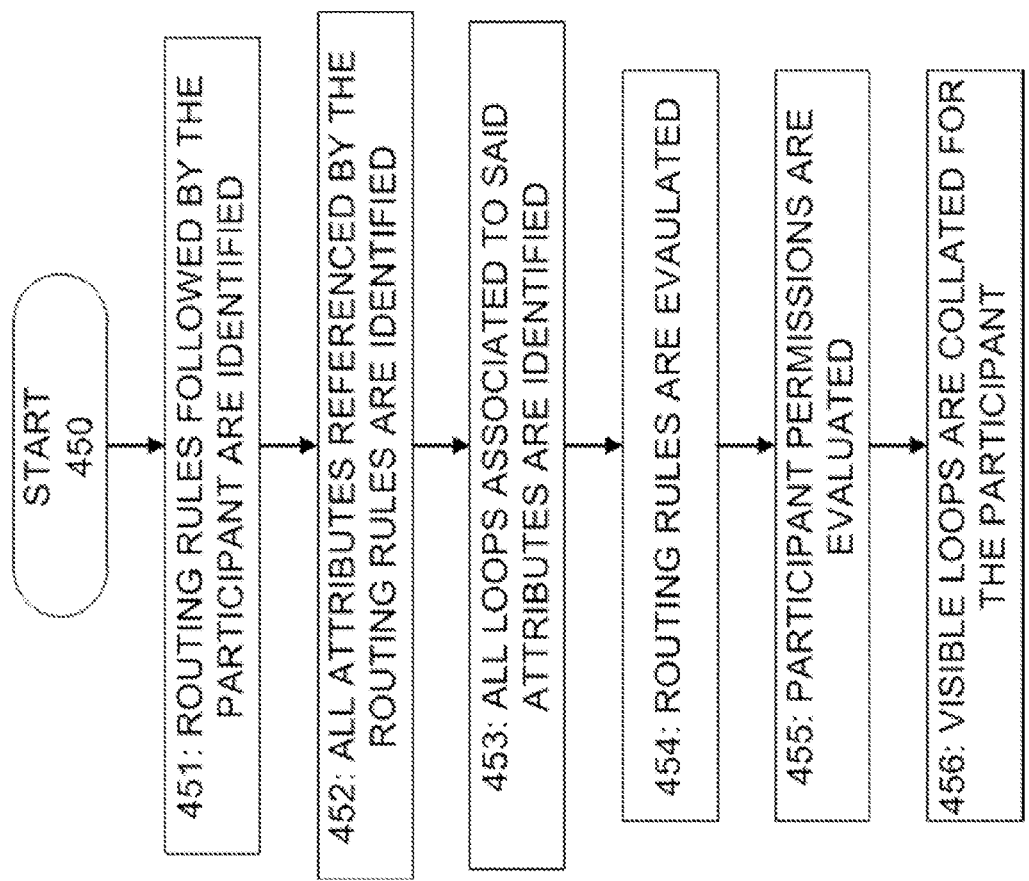
FIG. 9G is a flowchart illustrating a process for determining a set of loops visible to a participant according to some implementations of the present concepts.
Figure 10:
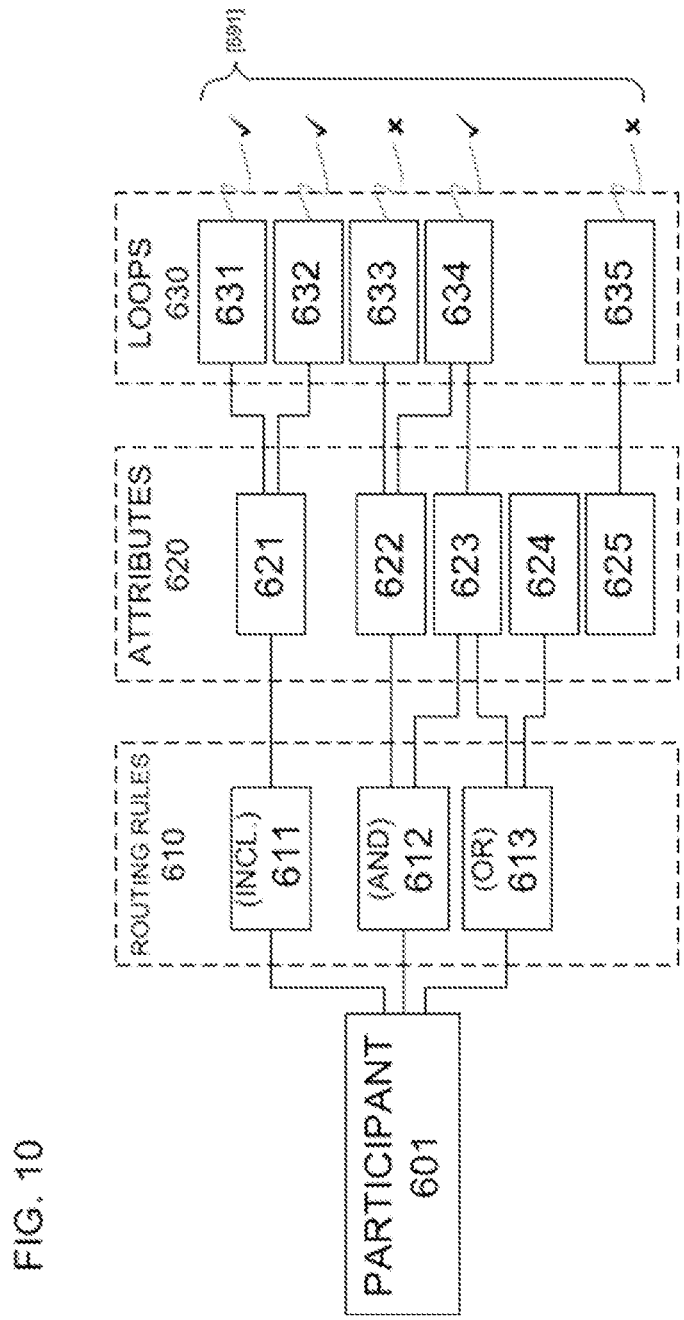
FIG. 10 illustrates changes to loop visibility for a participant as the process illustrated in FIG. 9G progresses.

FIG. 9G captures the process and FIG. 10 captures the structure of information describing how a system, for a given participant 601, determines the set of loops 630 visible to that participant. After starting at step 450, in step 451 the system first loads the routing rules followed by the participant 601, in this case routing rules 611, 612, and 613.

In step 452, for each routing rule all referenced attributes 620 are identified. For routing rule 611, attribute 621 is identified. For routing rule 612 (a Boolean AND rule), attributes 622 and 623 are identified. For routing rule 613 (a Boolean OR rule), attributes 623 and 624 are identified.

In step 453, for each routing rule and attribute set, all loops associated with that routing rule's attributes are identified. For routing rule 611, loops 631 and 632 are identified. For routing rule 612, loops 633 and 634 are identified.

In step 454, each routing rule is evaluated for the loops identified through associations. For each loop, the routing rules which evaluate to TRUE for the loop given the attribute associations of the loop, is identified. In step 455, the participants' permissions for the loops are evaluated to see whether they are appropriate.

In step 456, the loops which are visible to participant 601 is determined based on the above steps. As shown in FIG. 10, in this example, loops 631 and 632 are visible to participant 601. Loop 633 is not visible to participant 601 because the routing rule 612 is a Boolean AND of attributes 622 and 623. As loop 633 is only associated with attribute 622 and not 623, routing rule 612 is not satisfied for loop 633. Loop 634 is visible to participant 601 for two reasons: firstly because loop 634 meets the Boolean AND condition of routing rule 612 based on its associations to attributes 622 and 623, and secondly because it meets the Boolean OR condition of routing rule 613 based on its association to attribute 623. Loop 635 is not visible to participant 601 because there are no chained associations connecting participant 601 to loop 635. Since the participant has the appropriate permissions for loops 631, 632 and 634 the indicators 691 matching the loops are set appropriately.

In one implementation, the process outlined in FIG. 9G and FIG. 10 is carried out by a subsystem within the system used to implement the loop, such as, back-end processing subsystem 302 of enterprise system 300 of FIG. 2. Information is stored in tables, which are then stored within a database of the system used to implement the loop, such as database 303 of enterprise system 300 of FIG. 2.

Loop Engagement

In one implementation, participants in a loop can engage with the loop through various media, and utilizing devices, such as, for example, laptops, desktops, smartphones, tablets, or other similar devices. In one implementation, participants can visit a website using a generic URL. A participant can retrieve a loop using, for example, a reference number. The participant can then view the progress of issues within the loop, and add comments or answers where necessary. In another implementation, the participant can visit a website with a specific URL. Then the participant need not enter a reference number. Additional attributes and facets may also be added based on the specific URL used, and the context around the website visit such as the time of the day.

In another implementation, a participant can engage with the loop using an app.

In yet another implementation, a participant can engage with a loop by scanning a 2D bar code, or by using NFC, RFID or Bluetooth or other such communication protocols. The loop can then be viewed by the participant, who may engage by, for example, supplying comments or answers where necessary.

In yet another implementation, a participant can engage with the loop using SMS messaging. In one implementation, the participant sends an SMS message to a generic number. The participant also sends, for example, via the SMS message, a code or reference number to retrieve the right loop. This may be done, for example, when the participant sends the initial SMS message, or later when prompted. An alternative method to find the correct loop is to have the system look up a loop with the same phone number. Then, after a loop has been identified, the participant can add a comment or answer via SMS messages. In another implementation, the participant sends an SMS message to a specific number for the loop. Then the loop is retrieved immediately.

In yet another implementation, a participant engages with the loop using email. In one implementation, the participant sends an initial email message to a generic address. This may be done, for example, within the initial email message, or later when prompted. Then the participant can add a comment or answer a question. In another implementation, the participant sends an email message to a specific address connected to the loop. The participant can, for example, send comments or answers within the body of the email message.

In yet another implementation, a participant engages with the loop from a social networking site such as Twitter®. When the participant enters a microblog update on such a site, in order to engage the loop, the participant may use an appropriate tag such as "@mention" tag or a hashtag. Then the right loop is retrieved and the microblog update is entered. In another embodiment, a participant can engage with a loop via a "private reply" feature such as can be found in, for example, LinkedIn® or Twitter®, to submit confidential information such as a phone number and an email address. In a similar manner, a participant can engage with a loop from a site such as Yelp® or TripAdvisor® by adding comments, creating posts, and using the appropriate tags or keywords.

In yet another implementation, a participant engages with the loop from a chat program or site. The chat program is either standalone or embedded into another program or website.

In yet another implementation, a participant can engage with the loop by calling a provided phone number. In one implementation the phone number is generic, and the participant retrieves the right loop by, for example, dialing in a reference number when prompted by an interactive voice response system. In another embodiment, the system finds the right loop based on caller ID. In another implementation the phone number is specific to a particular loop. The participant can then enter a comment verbally, which may be further converted to text using a speech-to-text system. In another embodiment, the participant speaks to an operator who adds the message to the loop.

In yet another implementation, a participant can engage with the loop by creating video messages, attaching video recordings, and/or making video conferences. Examples of engagement methods have been described previously.

As mentioned previously, one or more ratings can be assigned to the loop via various media by one or more participants. The participant(s) can assign the ratings using the same methods outlined above to engage with the loop.

Figure 11A:
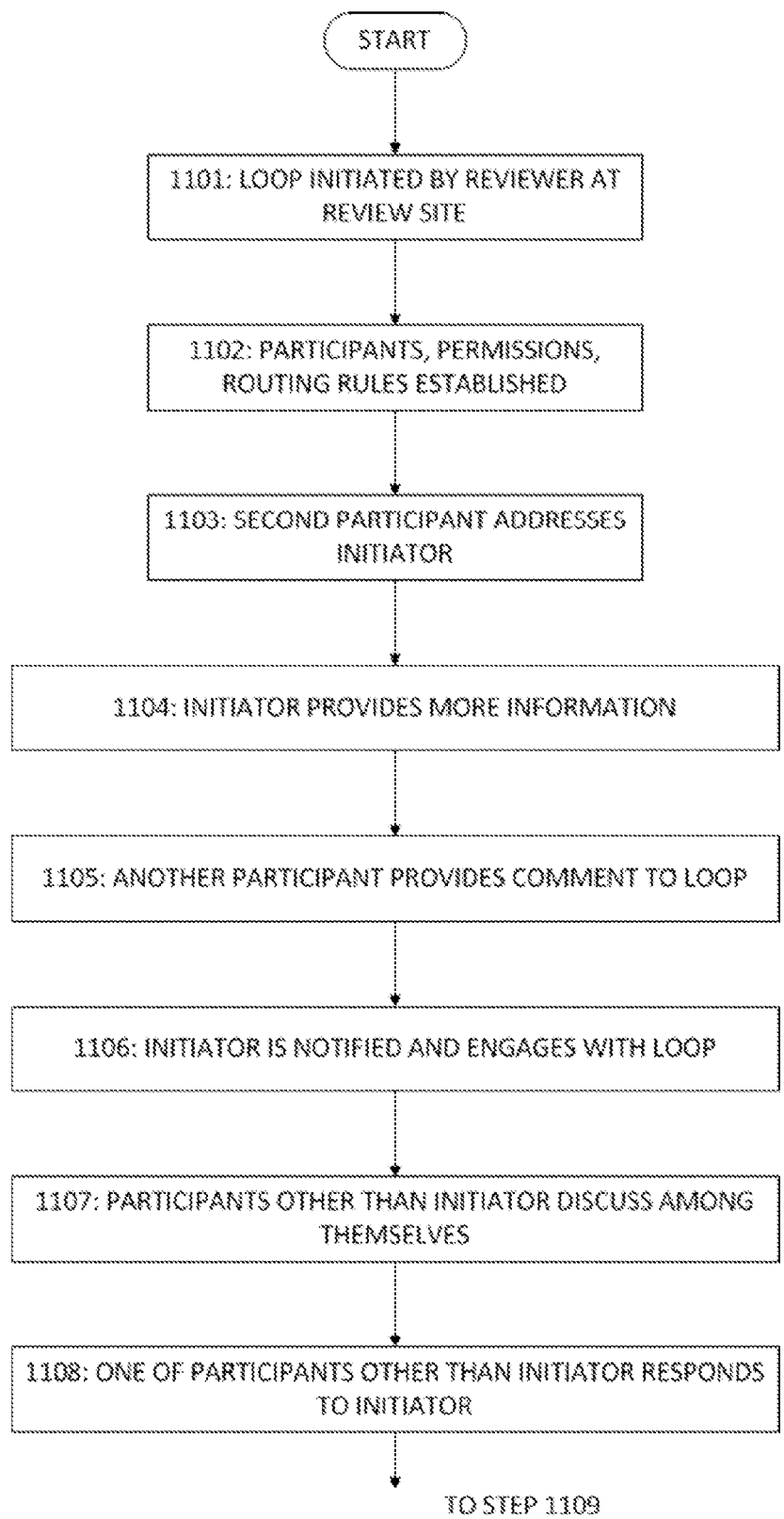
FIGS. 11A and 11B show an example of a flow of participant engagement.
Figure 11B:
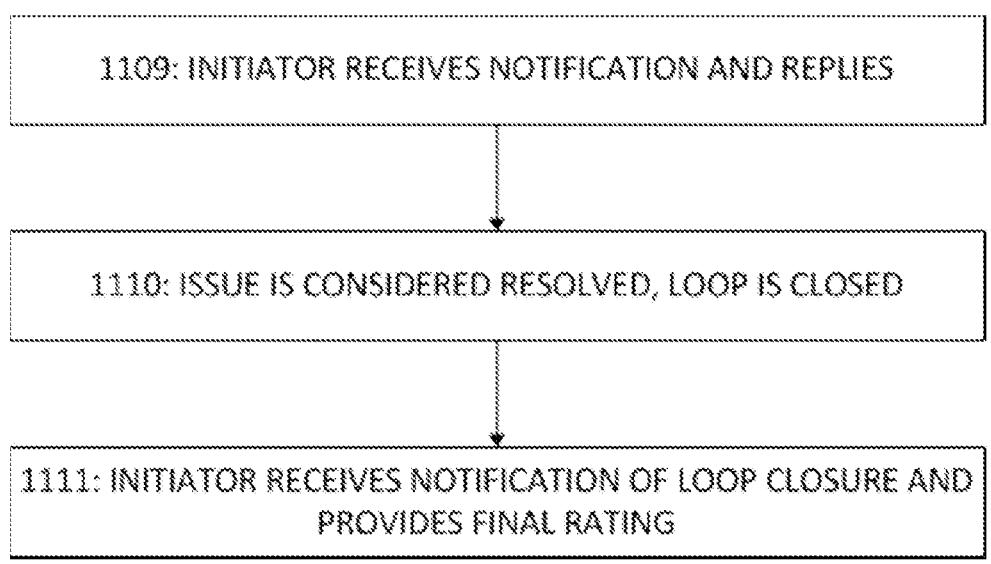

An example of a flow for participant engagement is shown in FIGS. 11A and 11B. In step 1101, the loop is initiated by a reviewer from a review site. Then using the above processes, in step 1102, the participants, permissions and routing rules are established. In step 1103, a second participant, who is an employee, then addresses the initiator on the same thread at the review site, by using, for example, an @mention tag, or by using the private reply feature such as previously discussed. Additionally, the second participant may supply a link for the initiator to provide contact information such as a phone number or an email address, or to add any additional comments. In step 1104, the initiator provides more information by, for example, using the link mentioned in step 1103, or by using the previously discussed private reply feature. In step 1105, another participant, different from the second participant provides a comment to the loop. In step 1106, the initiator is notified of this comment via, for example, SMS messaging, and engages with the loop by, for example, sending an SMS message to a specific number. In step 1107, participants engage in further discussion but exclude the initiator by using the appropriate permissions for the messages which form part of the discussion. In step 1108, one of the participants other than the initiator sends a response specific to the loop by, for example, email. In step 1109, the initiator then receives notification of the update by, for example, email, and sends a reply by, for example, email to a specific email address connected to the loop. In step 1110, the participants determine that the issue for which the loop was set up has been resolved and the loop is closed. In step 1111, the initiator receives notification of the closure of the loop, and can choose to provide a final rating on the outcome of the interaction using, for example, a website interface.

While particular implementations and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for communicating information between one or more participants of a loop associated with an issue resolution process, the one or more participants being associated with an organization, the system comprising:
   one or more servers to:
   (i) initiate a loop in response to receiving an input from a first participant of the loop via a first electronic device coupled to at least one of the one or more servers via a network,
   wherein said one or more servers initiate said loop based on a microblog update created on a social networking site, said initiation further comprising (1) capturing said created microblog update based on matching of said created microblog update to a retrieval criteria,
(2) filtering said captured microblog update to determine whether to remove said captured microblog update,
(3) wherein if said captured microblog update is not removed, prioritizing said captured and filtered microblog update based on at least one prioritization criterion,
    wherein said prioritization criterion comprises
    popularity of a microblogger who created the microblog update,
    influence of the microblogger,
    time differential between an event related to said created microblog update, and
    geographical proximity of the microblogger to the business where the event took place, and
(4) classifying said prioritized, captured and filtered microblog update as actionable, and
(ii) the loop being associated by at least one of said one or more servers with one or more attributes;
(iii) determine, based on one or more routing rules retrieved by said one or more servers from a database connected to said one or more servers, a second participant of the loop,
    wherein the determining of the second participant of the loop comprises the one or more servers using the one or more routing rules to determine if at least one of the one or more attributes is followed by the second participant, and
    wherein said one or more routing rules are set using either the first electronic device or a different electronic device;
(iv) in response to the determination, provide access to a first portion of information associated with the loop to the second participant;
(v) close said loop upon resolution of the issue;
(vi) upon said closure of the loop, generate data to enable tracking of performance of at least one of the one or more participants in resolving the issue; and
(vii) store said generated data within the database connected to said one or more servers.

2. The system of claim 1, wherein at least one of the one or more participants of the loop engages with the loop via one or more electronic devices.

3. The system of claim 1, wherein at least one of the one or more attributes is a derived attribute, wherein the one or more servers derive the at least one derived attribute using automated semantic analysis,
    wherein the deriving is based on (i) one or more logical rules, (ii) one or more inference-based rules about the one or more attributes, (iii) one or more inference-based rules about the one or more participants of the loop, or any combination thereof.

4. The system of claim 3, wherein at least one of the one or more attributes has a parent attribute,
    the parent attribute is a derived attribute, and
    said parental relationship determined using said automated semantic analysis.

5. The system of claim 3, wherein at least one of the one or more attributes has a child attribute,
    the child attribute is a derived attribute, and
    said parental relationship determined using said automated semantic analysis.

6. The system of claim 3, wherein the association of the loop with the one or more attributes is based on (i) one or more rules or (ii) one or more events occurring and wherein said association is performed either explicitly or implicitly.

7. The system of claim 1, further wherein
    said one or more servers use an organization chart to determine supervisors of at least one of said one or more participants;
    said system further comprising
        a notification subsystem running on at least one of the one or more servers to notify said supervisors of the initiation of the loop; and
        said one or more servers making said generated data available upon closure of the loop to said supervisors to enable tracking of performance of said at least one of said one or more participants.

8. The system of claim 1, further comprising a monitoring subsystem running on at least one of said one or more servers to monitor statistics related to said loop comprising
    (i) time that said loop has been live, and
    (ii) number of messages within the loop.

9. The system of claim 1, wherein said one or more servers forward information associated with the loop to a customer relationship management program, said forwarding operative to allow
    viewing of one or more portions of said forwarded information on a per customer basis; and
    monitoring performance of at least one of the one or more participants.

10. The system of claim 1, wherein said first electronic device is a kiosk.

11. The system of claim 1, wherein
    said attributes followed by the second participant are stored in a participant profile on the database that the routing rules are stored in;
    further wherein said second participant chooses the attributes to follow using a web interface running on either the first or the different electronic device.

12. The system of claim 1, wherein said generated data is combined with other performance data by said one or more servers to enable said tracking of performance of at least one of the one or more participants.

13. The system of claim 1, wherein said one or more routing rules are set using one or more facets via a hierarchical interface running on either the first electronic device or a different electronic device.

14. The system of claim 1, wherein upon closure of the loop
    said first participant receives notification of the closure of the loop by a notification subsystem running on at least one of the one or more servers;
    a website interface is made available by said one or more servers for said first participant to provide a final rating of the issue resolution process associated with the loop.

15. A system for communicating information between a plurality of participants of a plurality of loops associated with a plurality of issue resolution processes, the plurality of participants being associated with an organization, the system comprising:
    one or more servers to:
    (i) initiate said plurality of loops in response to receiving inputs from a plurality of first participants via a plurality of first electronic devices coupled to at least one of the one or more servers via a network,
        wherein said one or more servers initiate said plurality of loops based on at least one microblog update created on at least one social networking site, said initiation further comprising (1) capturing said created at least one microblog update based on matching of said created at least one microblog update to a retrieval criteria, (2) filtering said captured at least one microblog update to determine whether to remove said captured at least one microblog update, (3) wherein if said captured at least one microblog update is not removed, prioritizing said captured and filtered at least one microblog update based on at least one prioritization criterion, wherein said prioritization criterion comprises popularity of a microblogger who created the at least one microblog update, influence of the microblogger, time differential between at least one event related to said created at least one microblog update, and geographical proximity of the microblogger to the business where the at least one event took place, and (4) classifying said prioritized, captured and filtered at least one microblog update as actionable;

(ii) the plurality of loops being associated by at least one of said one or more servers with a plurality of attributes;

(iii) for at least one of the loops, determine, based on one or more routing rules retrieved by said one or more servers from a database connected to said one or more servers, one or more second participants of the at least one loop, wherein the determining of the one or more second participants of the at least one loop comprises the one or more servers using the one or more routing rules to determine if at least one of the one or more attributes is followed by the one or more second participants, wherein said one or more routing rules are set using one or more electronic devices;

(iv) in response to the determination, provide access to a first portion of information associated with the at least one loop to the one or more second participants;

(v) close at least some of said plurality of loops upon resolution of the issues associated with said at least some of said plurality of loops;

(vi) for each closed loop, generate data to enable tracking of performance of at least one of the one or more participants associated with said closed loop in resolving the issue; and (vii) store said generated data within the database connected to said one or more servers.

16. The system of claim 15, further wherein for each of said one or more second participants said one or more servers determine which of the one or more routing rules are associated with the corresponding second participant;

based on said determining of the associated routing rules, said one or more servers determine which of the attributes are followed by the corresponding second participant; and based on said determining of the followed attributes, said one or more servers determine which of the plurality of loops are visible to the corresponding second participant.

17. The system of claim 16, wherein one or more of the plurality of loops are visible to the corresponding second participant, further wherein a monitoring subsystem running on at least one of said one or more servers monitors statistics related to each said visible loop comprising (i) time that each said visible loop has been live, and (ii) number of messages within each said visible loop.

18. The system of claim 17, wherein for the corresponding second participant, upon closure of each said visible loop, said one or more servers determines the percentage of total loops involving the corresponding second participant which have been resolved.

19. The system of claim 17, wherein for each corresponding second participant, upon closure of each said visible loop, said one or more servers determines the number of outstanding loops for the corresponding second participant.

20. A system for communicating information between a plurality of participants of a plurality of loops associated with a plurality of issue resolution processes, the one or more participants being associated with an organization, the system comprising:

one or more servers to:

(i) initiate said plurality of loops in response to receiving inputs from a plurality of first participants via a plurality of first electronic devices coupled to at least one of the one or more servers via a network, wherein said one or more servers initiate said plurality of loops based on at least one microblog update created on at least one social networking site, said initiation further comprising (1) capturing said created microblog update based on matching of said created microblog update to a retrieval criteria, (2) filtering said captured microblog update to determine whether to remove said captured microblog update, (3) wherein if said captured microblog update is not removed, prioritizing said captured and filtered microblog update based on at least one prioritization criterion, wherein said prioritization criterion comprises popularity of a microblogger who created the microblog update, influence of the microblogger, time differential between at least one event related to said created at least one microblog update, and, geographical proximity of the microblogger to the business where said at least one event took place, and (4) classifying said prioritized, captured and filtered microblog update as actionable;

(ii) the loops being associated by at least one of said one or more servers with a plurality of attributes;

(iii) determine, based on one or more routing rules retrieved by said one or more servers from a database connected to said one or more servers, one or more second participants of the at least one loop, wherein the determining of the one or more second participants of the at least one loop comprises the one or more servers using the one or more routing rules to determine if at least one of the one or more attributes is followed by the one or more second participants, wherein said one or more routing rules are set using one or more electronic devices, (iv) determine, using an organization chart, supervisors of at least one of said one or more second participants, further wherein a notification subsystem running on at least one of the one or more servers notify said supervisors of the initiation of the loop;

(v) in response to the determination, provide access to a first portion of information associated with the at least one loop to the one or more second participants;

(vi) close at least some of said plurality of loops upon resolution of the issues associated with said at least some of said plurality of loops;

(vii) generate data to enable tracking of performance of at least one of the one or more second participants associated with said closed loops in resolving the issue;

(viii) store said generated data within the database connected to said one or more servers;

(ix) make available said generated data to said supervisors of at least one of the one or more second participants to enable tracking of performance;

(x) send, using said notification subsystem, notifications of closure of said loops to said first participants associated with said closed loops;

(xi) make available a website interface for each of said first participants to provide a final rating on the outcome of the issue resolution process associated with each of said closed loops; and (xii) forward said final ratings data to a customer relationship management program to enable viewing of said final ratings data on a per-customer basis by said supervisors.

\* \* \* \* \*